US012675804B2

(12) United States Patent
Hang et al.

(10) Patent No.: US 12,675,804 B2
(45) Date of Patent: Jul. 7, 2026

(54) SYSTEM AND METHOD FOR DYNAMIC SEGMENTATION OF NETWORK NODES TO MANAGE WORKFLOW DATA SYNCHRONIZATION

(71) Applicant: Altafid, Inc., Bloomington, MN (US)

(72) Inventors: Duc Hang, Huntington Beach, CA (US); Naresh Ramanuja, Rancho Palos Verdes, CA (US); Vito Sciaraffia, Austin, TX (US); Prashant Mishra, Frisco, TX (US)

(73) Assignee: Altafid, Inc., Bloomington, MN (US)

( * ) Notice: Subject to any disclaimer, the term of this patent is extended or adjusted under 35 U.S.C. 154(b) by 82 days.

(21) Appl. No.: 18/066,979

(22) Filed: Dec. 15, 2022

(65) Prior Publication Data

US 2023/0267488 A1    Aug. 24, 2023

Related U.S. Application Data

(63) Continuation of application No. PCT/US2022/081717, filed on Dec. 15, 2022.

(60) Provisional application No. 63/290,207, filed on Dec. 16, 2021.

(51) Int. Cl.
*G06Q 10/02* (2012.01)
*G06Q 30/0204* (2023.01)
*G06Q 30/0251* (2023.01)

(52) U.S. Cl.
CPC ..... *G06Q 30/0204* (2013.01); *G06Q 30/0269* (2013.01)

(58) Field of Classification Search
CPC .......................... G06Q 30/0204; G06Q 30/02
See application file for complete search history.

(56) References Cited

U.S. PATENT DOCUMENTS

| | | | |
|---|---|---|---|
| 6,609,110 B1 | 8/2003 | Dowd et al. | |
| 7,016,873 B1 | 3/2006 | Peterson et al. | |
| 11,610,207 B1 * | 3/2023 | Chowdhury | ....... G06Q 20/4016 |
| 2003/0028466 A1 | 2/2003 | Jenson et al. | |
| 2004/0049397 A1 | 3/2004 | Leisure et al. | |
| 2007/0282728 A1 | 12/2007 | Carpenter et al. | |
| 2009/0222302 A1 * | 9/2009 | Higgins | ................. G06Q 30/02 |
| | | | 705/14.16 |
| 2009/0292649 A1 | 11/2009 | Somech et al. | |
| 2010/0094774 A1 | 4/2010 | Jackowitz et al. | |

(Continued)

FOREIGN PATENT DOCUMENTS

CA          2659698 A1 *  9/2009   ......... G06Q 10/0637

OTHER PUBLICATIONS

Direr, Alexis, and Michael Visser. "Portfolio choice and financial advice." Finance 34.2 (2013): 35-64. (Year: 2013).*

(Continued)

*Primary Examiner* — Hamzeh Obaid

(74) *Attorney, Agent, or Firm* — Wilson Sonsini Goodrich & Rosati

(57) ABSTRACT

Systems and methods are provided for managing workflow including the ability to manage workflow strategy and activity, and provide suggestions to optimize workflow strategy and activity. The method comprises processing product traits, adjusted customer profile, and advisor profiles, by a matching engine, to generate an output indicative of a match among the customer, one of the advisors and a product.

13 Claims, 21 Drawing Sheets

(56) References Cited

U.S. PATENT DOCUMENTS

| 2011/0251978 | A1 | 10/2011 | Davies et al. | |
| 2012/0158465 | A1* | 6/2012 | Golembiewski | G06Q 10/06 |
| | | | | 705/7.42 |
| 2016/0125036 | A1* | 5/2016 | Hanson | G06F 16/435 |
| | | | | 707/733 |
| 2016/0364663 | A1* | 12/2016 | Gupta | G06Q 30/0205 |
| 2018/0285975 | A1* | 10/2018 | Ewanio | G06F 16/9535 |
| 2019/0317754 | A1* | 10/2019 | Mosquera | H04L 41/5009 |
| 2020/0242699 | A1* | 7/2020 | Mozeika | G06F 3/0481 |
| 2021/0241292 | A1* | 8/2021 | Pandey | G06N 3/044 |
| 2023/0129390 | A1* | 4/2023 | Fusco | G06N 5/01 |
| | | | | 706/12 |

OTHER PUBLICATIONS

PCT/US2022/081717 International Search Report and Written Opinion dated Mar. 20, 2023.

* cited by examiner

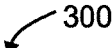
300

Engagement Processing Ring – Looks for events that triggers portfolio adjustment in customer's profile and triggers Customer Scoring Module (302)

Customer Scoring Module – recalculates the wellness score and triggers next steps (304)

Fiduciary Alignment Ring (FAR) – Process within FAR generates recommendations on possible strategy and goal changes for the customer (306)

Fiduciary Alignment Ring : Advisor Matching generate advisor and product list based on life event (308)

Fiduciary Alignment Ring : Risk Management generate possible updates to the portfolio based on risk score (310)

Engagement Processing Ring– Advisor Assistant, notifies advisors to initiate engagement with customer based on FAR recommendations (312)

Engagement Ring – Customer notification, notifies customers about need for certain products that are best served by certain advisors based on their expertise and fiduciary alignment (314)

Impact Quantification (IQ) – Process within IQ that detects product, strategy, etc. changes and correlates to FAR generated recommendation. IQ quantifies the impact of the implemented recommendation to align customer financial strategy to changes to customer life stage (316)

FIG. 3

400

Engagement Processing Ring– monitor market data to identify events that may trigger portfolio adjustment (402)

Fiduciary Alignment Ring(FAR) : Risk Management generate possible updates to the portfolio based on potential drawdowns due to market conditions (404)

Engagement Processing Ring– Advisor Assistant, notifies advisors to initiate engagement with customer based on FAR recommendations for drawdown (406)

Engagement Processing Ring– Customer notification, notifies customers about market condition and effect of that to customer's portfolio (408)

Impact Quantification – Process within IQ that detects engagement between advisors and customers and correlated to FAR generated recommendation. . IQ quantifies the impact of customer sentiment and related customer satisfaction (410)

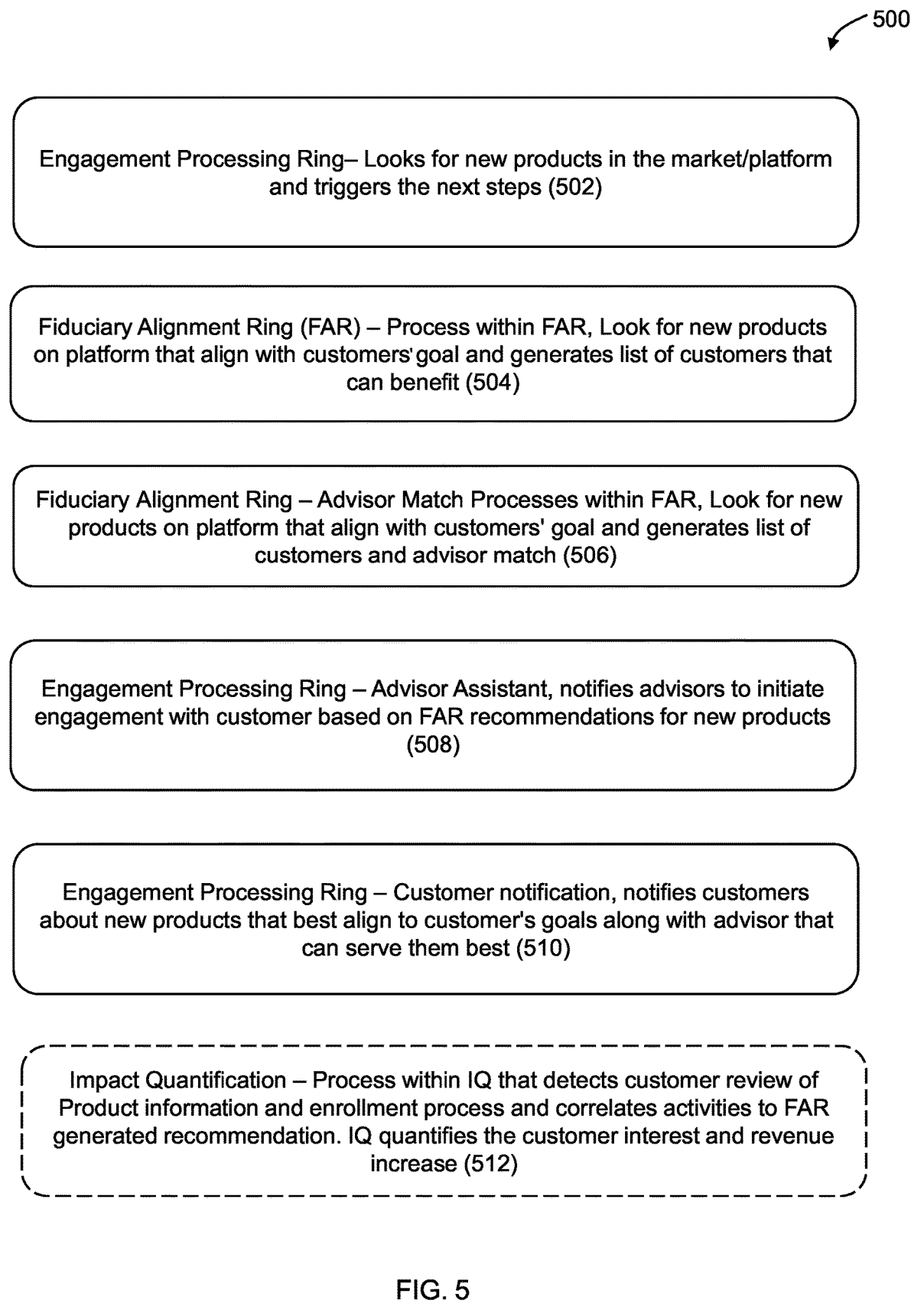

Engagement Processing Ring– Looks for new products in the market/platform and triggers the next steps (502)

Fiduciary Alignment Ring (FAR) – Process within FAR, Look for new products on platform that align with customers' goal and generates list of customers that can benefit (504)

Fiduciary Alignment Ring – Advisor Match Processes within FAR, Look for new products on platform that align with customers' goal and generates list of customers and advisor match (506)

Engagement Processing Ring – Advisor Assistant, notifies advisors to initiate engagement with customer based on FAR recommendations for new products (508)

Engagement Processing Ring – Customer notification, notifies customers about new products that best align to customer's goals along with advisor that can serve them best (510)

Impact Quantification – Process within IQ that detects customer review of Product information and enrollment process and correlates activities to FAR generated recommendation. IQ quantifies the customer interest and revenue increase (512)

FIG. 5

| | | |
|---|---|---|
| Client Empowering | Customers<br>• Enabling features to provide customer the ability to discover and select products and to provide fiduciary guidance to achieve financial goals | Wealth Consultancy Firms<br>• Enabling features to provide efficient customer engagements and streamlined operations to dramatically scale firm's business |
| Data Driven Intelligence | Event Capture & Big Data Analytics<br>• Listening and learning from business events, client engagements, risk tolerance, sales conversion, and many other core interactions | Smarter Advice<br>• Recommending and providing actionable insights to align all parties to Customer financial goals |
| Conversational | Trusted Network<br>• Establishes closed social engagement between Customers, consultants, and platform to share knowledge and commentary | Multi-Channel Enablement<br>• Optimized and efficient communication across voice, messaging, and video |
| Marketplace Enabled | Product Provider Connectors<br>• Realtime interface with enables bidirectional flow of product catalog & offer qualification, and product activation | Partnerships<br>• Manages product and customer access across Consultant ecosystem |
| Cloud Native Scalability | Modern Cloud Architecture<br>• Utilized the latest Micro Services and cloud infrastructure to enable massive scalability to grow seamlessly with business volume | 3rd Party Extensions<br>• Integration framework to enable 3rd party solutions to rapidly augment platform capabilities |

FIG. 7

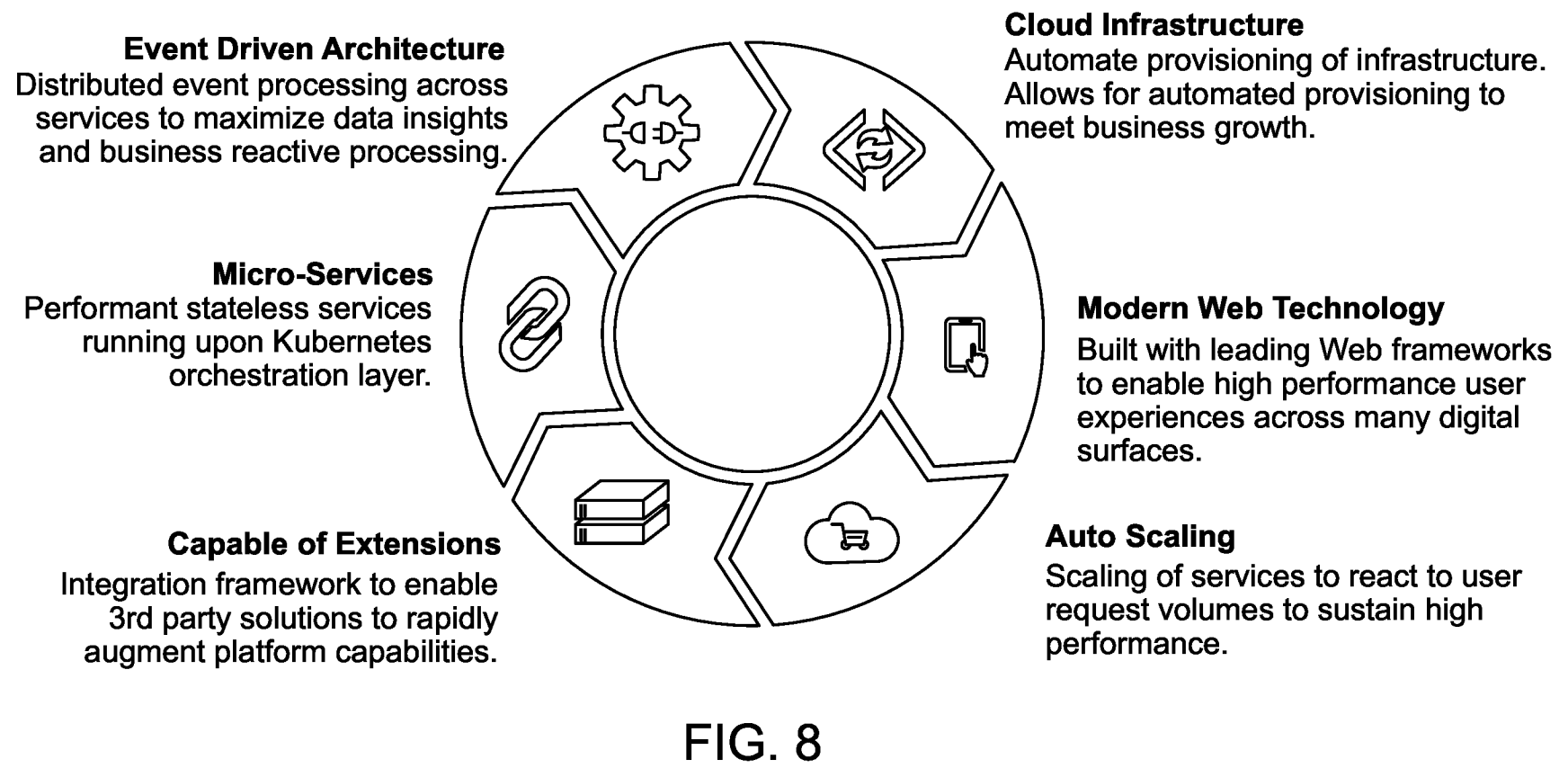

Cloud Infrastructure
Automate provisioning of infrastructure. Allows for automated provisioning to meet business growth.

Modern Web Technology
Built with leading Web frameworks to enable high performance user experiences across many digital surfaces.

Auto Scaling
Scaling of services to react to user request volumes to sustain high performance.

Event Driven Architecture
Distributed event processing across services to maximize data insights and business reactive processing.

Micro-Services
Performant stateless services running upon Kubernetes orchestration layer.

Capable of Extensions
Integration framework to enable 3rd party solutions to rapidly augment platform capabilities.

FIG. 8

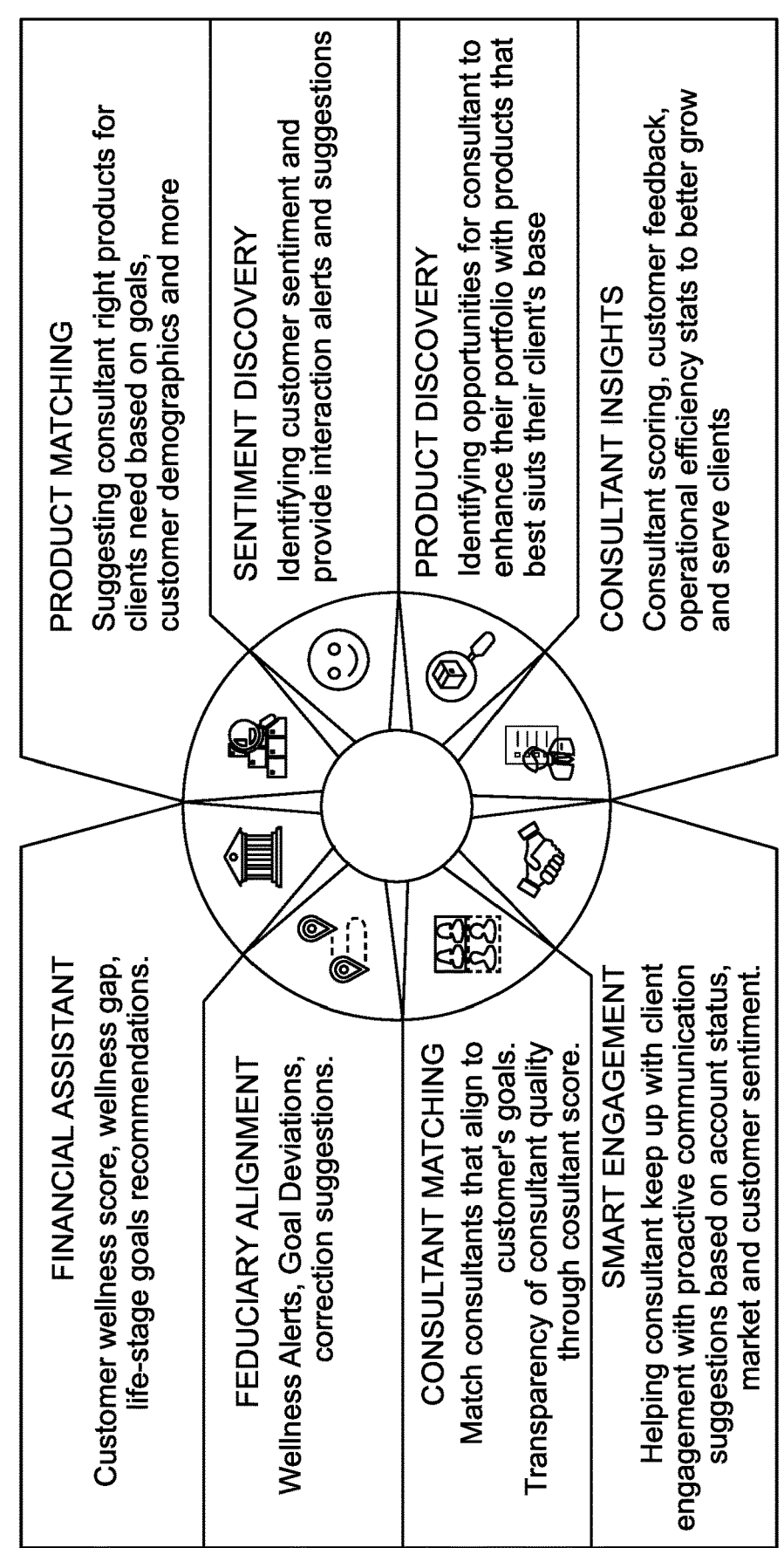

PRODUCT MATCHING

Suggesting consultant right products for clients need based on goals, customer demographics and more

SENTIMENT DISCOVERY

Identifying customer sentiment and provide interaction alerts and suggestions

PRODUCT DISCOVERY

Identifying opportunities for consultant to enhance their portfolio with products that best siuts their client's base

CONSULTANT INSIGHTS

Consultant scoring, customer feedback, operational efficiency stats to better grow and serve clients

FINANCIAL ASSISTANT

Customer wellness score, wellness gap, life-stage goals recommendations.

FEDUCIARY ALIGNMENT

Wellness Alerts, Goal Deviations, correction suggestions.

CONSULTANT MATCHING

Match consultants that align to customer's goals. Transparency of consultant quality through cosultant score.

SMART ENGAGEMENT

Helping consultant keep up with client engagement with proactive communication suggestions based on account status, market and customer sentiment.

FIG. 15

| Audience | Intelligence | |
|---|---|---|
| Customer | Financial Assistant | • Analyzing: Customer Wellness Score, Wellness Gap Analysis<br>• Claim: Provide Product recommendation based on goals and respective selected strategy for Customer Life stage |
| Customer | Fiduciary Aligment | • Analyzing: Wellness Alerts, Deviation from Goal Alerts, market insight<br>• Claim: Realignment of selected products based on deviation of goals and market conditions |
| Customer & Consultancy | Consultant Matching | • Analyzing: Discovery Of Partners, Partner scoring, Customer Goals/Strategy<br>• Claim: Match potential Consultants based customer's goals and respective selected strategy |
| Customer & Consultancy | Smarter Engagement | • Analyzing: Churn Risk, Preemptive follow-ups<br>• Claim: Align Consultant's "activities" to customer's goals and respective selected strategy |
| Customer & Consultancy | Sentiment Discovery | • Analyzing: Sentiment Analysis, Engagement Forecast, Churn Risk<br>• Claim: To predict Customer concerns and overall sentiment to subscribed products, engaged consultant, and overall platform |
| Consultancy | Product Matching | • Analyzing: Segmentation and look alike analysis, Product Scoring, Market Insights<br>• Claim: Provide Product recommendation for Consultants based on Customer's goals and respective strategy |
| Consultancy | Product Discovery | • Analyzing: Discovery of matching products, Product Scoring, Customer Segmentation<br>• Claim: Supports consultants to enhance their offering based on current Customer segmentation and Altafid overall product catalog |
| Consultancy | Consultant Insight | • Analyzing: Revenue Analytics, Partner Scoring, Staff efficiency<br>• Claim: Supports consulting firm to be more operationally efficient to grow Customers and revenue |

FIG. 16

Enablement: Recommendation

RECOMMENDATIONS

PRODUCT MATCHING
Product that suits the need based on goal, life stage and more

CONSULTANT MATCHING
Recommend consultant that can best handle client need.

FINANCIAL ALIGNMENT
Customer wellness score, Gap identification and products recommendation for gaps FIDUCIARY ALIGNMENT
Products that need to be altered based on goals, current performance and market fluctuations.

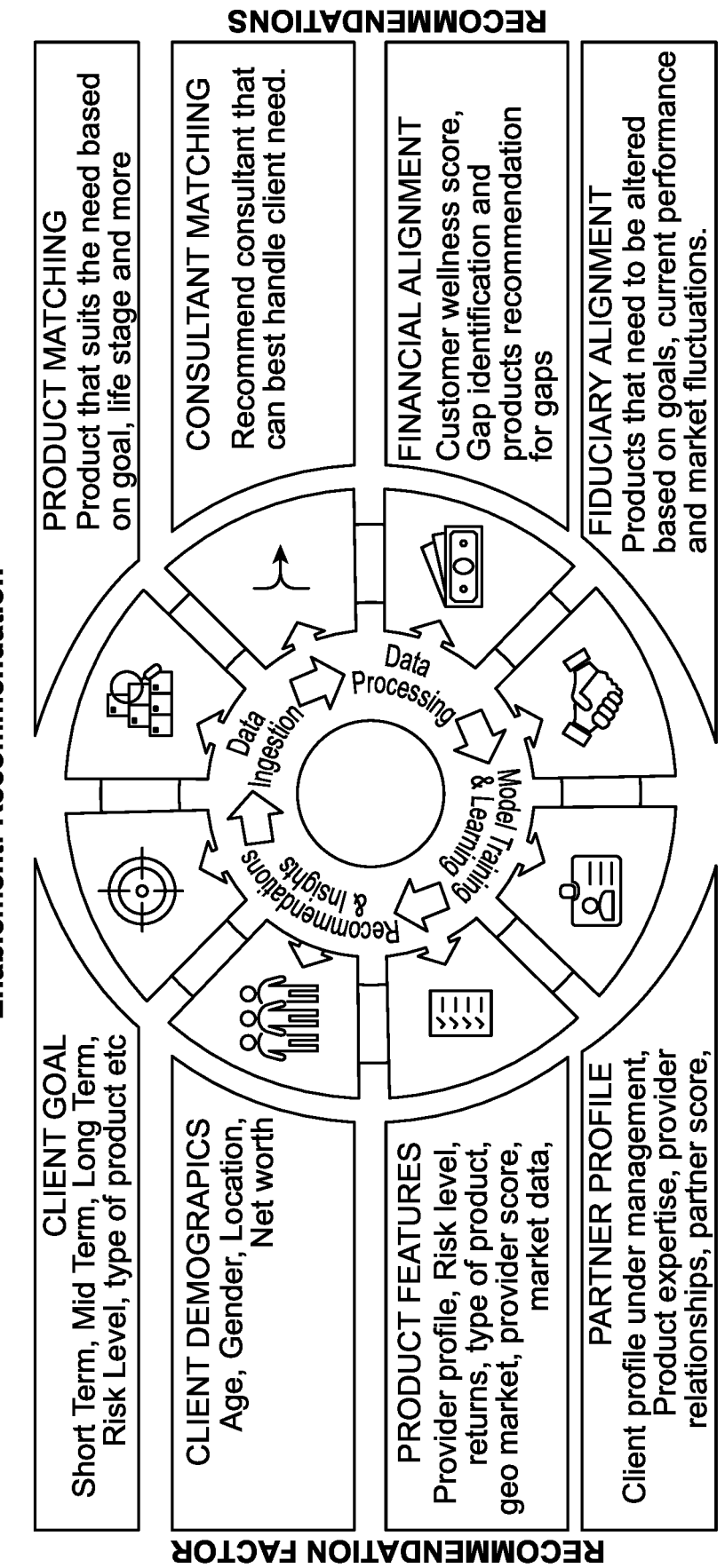

Data Ingestion
Data Processing
Model Training & Learning
Recommendations & Insights CLIENT GOAL
Short Term, Mid Term, Long Term, Risk Level, type of product etc CLIENT DEMOGRAPICS
Age, Gender, Location, Net worth PRODUCT FEATURES
Provider profile, Risk level, returns, type of product, geo market, provider score, market data, PARTNER PROFILE
Client profile under management, Product expertise, provider relationships, partner score,

RECOMMENDATION FACTOR

FIG. 17

SYSTEM AND METHOD FOR DYNAMIC SEGMENTATION OF NETWORK NODES TO MANAGE WORKFLOW DATA SYNCHRONIZATION

CROSS-REFERENCE TO RELATED APPLICATION

This application is a continuation of International Patent Application No. PCT/US2022/081717, filed Dec. 15, 2022, which claims the benefit of and priority to U.S. Provisional Patent Application No. 63/290,207 filed on Dec. 16, 2021, which application is incorporated herein by reference in its entirety for all purposes.

BACKGROUND

In workflow management platforms, a computer network may facilitate the exchange and/or delivery of data packets for workflow, or communications, between multiple client nodes and platforms. Often, the same communications may be broadcast to all nodes. However, this may create unnecessary traffic over the network and an overload of information for the recipient users. Further, the transmitting user may find it difficult to track the broadcasted communication with each recipient user. This problem has intensified with the increasing use of mobile devices that allows for the timeless and remote transmission, receipt, and access of data by users. In order to facilitate more efficient communication between users, a more sophisticated approach towards the generation and distribution of communications for workflow may be required. Additionally or alternatively, it is difficult for a practitioner (e.g., financial advisors) to manage and serve a large number of customers while creating personalized recommendations for each customer. Each customer may have different financial goals, risk tolerance levels, different family structures, etc. Each financial product may also have different characteristics. It generally takes a significant amount of time for a financial advisor to study these information regarding the customers and the financial products to provide a customized recommendation. Thus, financial advising services from a professional financial advisor can be expensive and not accessible for a number of customers. In order to facilitate more efficient financial recommendations, a more sophisticated approach towards the generation and distribution of communications for workflow may be required.

SUMMARY

Recognized herein is a need to deliver highly customized, relevant, optimized communications to selected (segmented) client nodes in a computer network. Systems and methods herein provide users (e.g., transmitting users) with an online/mobile platform configured to deliver dynamically-generated communications or recommendations to recipient users and track relevant user performance metrics of such communications. The present disclosure relates to a system and method for managing workflow including the ability to manage workflow strategy and activity, and provide suggestions to optimize workflow strategy and activity.

According to an aspect of the present disclosure, the system may allow for a more customized, efficient, optimized sales performance for financial products. For example, the system may enable a matching between financial advisers and customers. The system may facilitate the development of strategies and workflows for financial advisers to better serve customers' needs. The system may facilitate recommending the financial products that best suit customers' goals and risk tolerance levels. The system may facilitate recommending the manners of interactions (e.g., channels, timing, frequencies, etc.) for financial advisors to optimize the engagements of the customers. The system may use machine-learning techniques to optimize the suggestions based on prior interactions and dynamically optimize the suggestions based on any new events.

According to an aspect, the present disclosure provides a computer-implemented method for dynamically generating a recommendation, the method comprising: maintaining a database configured to store i) customer profiles associated with a plurality of customers, wherein the customer profiles comprise customer portfolios; ii) product traits associated with a plurality of products; and iii) advisor profiles associated with a plurality of advisors; receiving an event, wherein the event is indicative of one of a plurality of triggers to portfolio adjustment; processing the product traits, the customer profiles, and the advisor profiles, by a matching engine, to generate an output indicative of a match between one of the customers and one of the advisors for a product, wherein the product is selected to facilitate the portfolio adjustment based on the product traits, wherein said matching engine has been trained on a training data set comprising a plurality of customer profiles, advisor profiles, and product traits, and wherein the customer profiles, the advisor profiles, and the product traits are labeled as matched or not matched based on past matching results; and generating a recommendation indicative of a match between one of the plurality of customers and one of the plurality of advisors for the product.

Another aspect of the present disclosure provides a computer-implemented method for dynamically generating a recommendation, the method comprising: maintaining a database configured to store i) customer profiles associated with a plurality of customers, wherein the customer profiles comprise customer goals and customer portfolio; ii) product traits associated with a plurality of products; and iii) advisor profiles associated with a plurality of advisors; receiving an event, wherein the event is indicative of a market change; processing customer profiles to identify a list of customers based on a discrepancy between the customer goals and a forecast of the customer portfolio in light of the market change; processing the product traits, the customer profiles associated with the list of customers, and the advisor profiles, by a matching engine, to generate an output indicative of a match between one of the list of customers and one of the advisors for a product, wherein the product is selected to facilitate a portfolio adjustment based at least in part on the market change, wherein said matching engine has been trained on a training data set comprising a plurality of customer profiles, advisor profiles, and product traits, and wherein the customer profiles, the advisor profiles, and the product traits are labeled as matched or not matched based on past matching results; and generating a recommendation indicative of a match between one of the list of customers and one of the plurality of advisors for the product.

Another aspect of the present disclosure provides a computer-implemented method for dynamically generating a recommendation, the method comprising: receiving a product profile associated with a product; aggregating a list of customers based at least in part on customer profiles associated with a plurality of customers and the product profile; obtaining advisor profiles associated with a plurality of advisors; processing the product profile, the customer profiles associated with the list of customers, and the advisor profiles, by a matching engine, to generate an output indicative of a match between one of the list of customers and one of the advisors for the received product, wherein said matching engine has been trained on a training data set comprising a plurality of customer profiles, the advisor profiles, and the product profiles from a plurality of customers, advisors and products, and wherein the plurality of customer profiles, the advisor profiles, and the product profiles are labeled as matched or not matched based on past matching results, and presenting the output indicative of a match between the customer and the advisor to the advisor and the customer.

Another aspect of the present disclosure provides electronic automation through computer networks (e.g., cloud or on-premise) to utilize transaction processing, online analytical processing, machine-learning, and AI technologies.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 3 is a flow diagram depicting an example process for managing workflow including the ability to manage workflow strategy and activity, and provide suggestions to optimize workflow strategy and activity, according to one exemplary embodiment.

FIG. 4 is a flow diagram depicting an example process for managing workflow including the ability to manage workflow strategy and activity, and provide suggestions to optimize workflow strategy and activity, according to one exemplary embodiment.

FIG. 5 is a flow diagram depicting an example process for managing workflow including the ability to manage workflow strategy and activity, and provide suggestions to optimize workflow strategy and activity, according to one exemplary embodiment.

FIG. 7 is graphical representations of an example illustration of the advantages and benefits, without limitation, provided by various modules and platforms according to one exemplary embodiment.

FIG. 8 is graphical representations of an example illustration of the cloud native scalability provided by various modules and platforms according to one exemplary embodiment.

FIG. 15 is graphical representations of an example illustration of the functionalities provided by various modules and platforms according to one exemplary embodiment.

FIG. 16 is graphical representations of an example illustration of the underlying analysis for different audiences provided by various modules and platforms according to one exemplary embodiment.

FIG. 17 is graphical representations of an example illustration of the recommendation functionalities and entities provided by various modules and platforms according to one exemplary embodiment.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Figure 1A:
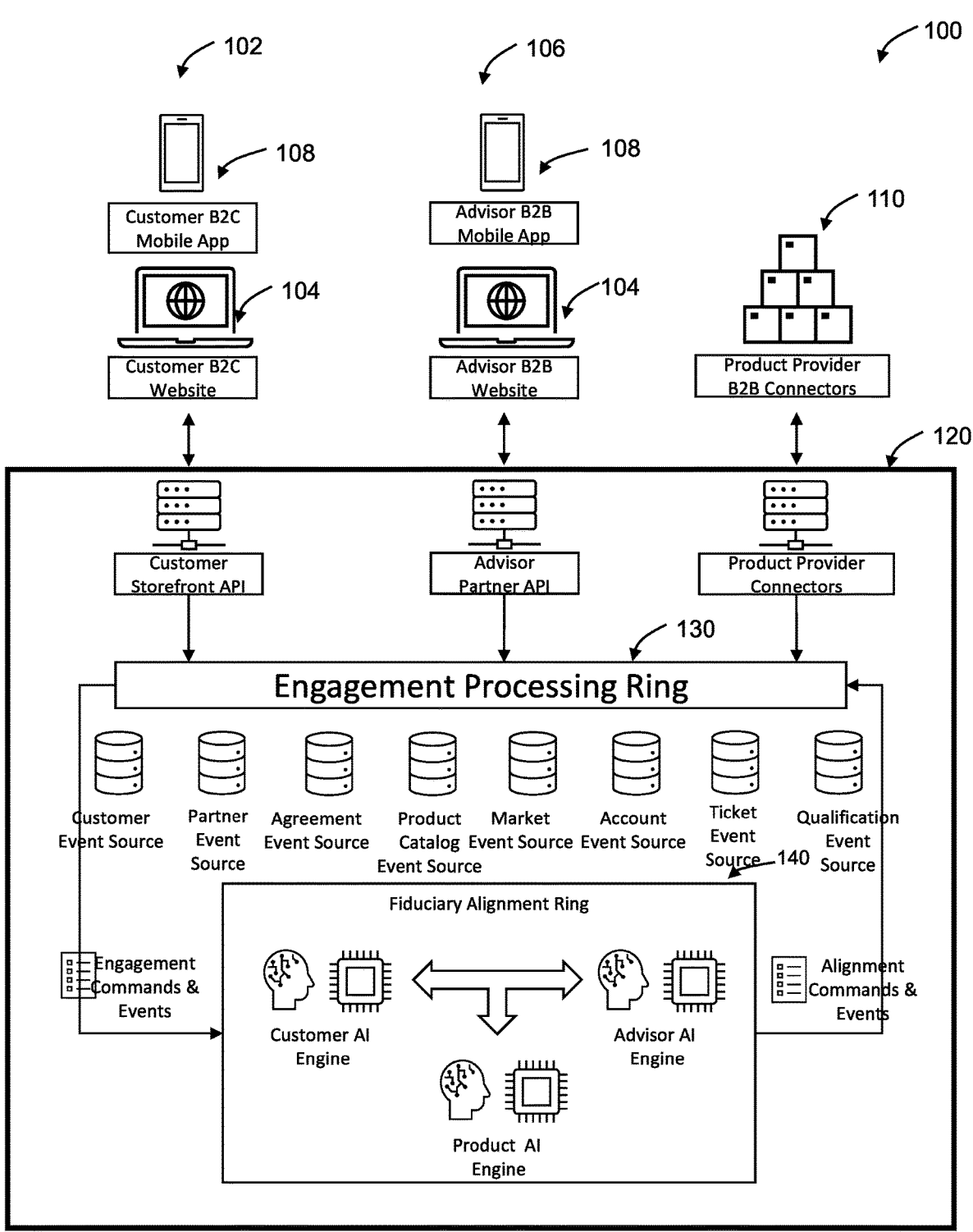
FIG. 1A schematically illustrates a block diagram of an exemplary system for managing workflow including the ability to manage workflow strategy and activity, and provide suggestions to optimize workflow strategy and activity.

FIG. 1A schematically illustrates a block diagram of an exemplary system 100 for managing workflow. The system may be capable of managing a workflow strategy and activity, as well as generating suggestions to optimize a workflow strategy and activity. A platform (e.g., machines and software, possibly interoperating via a series of network connections, protocols, application-level interfaces, and so on), in the form of a server platform 120, provides server-side functionality via a communication network (not shown; e.g., the Internet or other types of wide-area networks (WANs), such as wireless networks or private networks with additional security appropriate to tasks performed by a user) to one or more client nodes 102, 106, and/or product provider B2B connectors 110. FIG. 1A illustrates, for example, a set of customer side client nodes 102 hosting a web extension 104 and/or a mobile application 108, thus allowing a user to access functions provided by the server platform 120, for example, receiving interactions or notifications from the server platform 120, sending instructions to the server platform 120, and the like. The web extension 104 may be compatible with any web browser application used by a user of the client node. Delivery may be through a wired or wireless mode of communication. Further, FIG. 1A illustrates, for example, a set of advisor side client nodes 106 hosting a web extension 104 and/or a mobile application 108, thus allowing a user to access functions provided by the server platform 120, for example, receiving interactions or notifications from the server platform 120, sending instructions to the server platform 120, and the like. Delivery may be through a wired or wireless mode of communication.

A client node (e.g., client node 102 and/or client node 106) may be, for example, a user device (e.g., mobile electronic device, stationary electronic device, etc.). A client node may be associated with, and/or be accessible to, a user (e.g., customer and/or financial advisor). In another example, a client node may be a computing device (e.g., server) accessible to, and/or associated with, an individual or entity. A client node may comprise a network module (e.g., network adaptor) configured to transmit and/or receive data. Via the nodes in the computer network, multiple users and/or servers may communicate and exchange data. In some instances, the client nodes may receive and present to a user an Internet-featured item (e.g., an image and/or name of a product). For example, the customer side client nodes 102 may receive information associated with the item from the server platform 120. Examples of the information associated with the item include, without limitation, item name (e.g., product name), item identification number, item description, item category (e.g., investments, insurance, and/or loans and the like), item minimum investments amount, item risk rating, etc. The customer side client nodes 102 may also receive information associated with one or more financial advisors from the server platform 120. Examples of the information associated with financial advisors may include, without limitation, rating of the financial advisor, specialties of the financial advisor, demographic information of the financial advisor, etc. The advisor side client nodes 106 may receive information associated with one or more customers and financial products from the server platform 120.

The server platform may be in communication with a set of product provider B2B connectors 110. In some instances, the product provider B2B connectors 110 may transmit parameters regarding one or more products devised by the product providers or creators of the products (e.g., various types of investments, insurance, and/or loans and the like) for possible presentation to one or more users.

In at least some examples, the server platform 120 may be one or more computing devices or systems, storage devices, and other components that include, or facilitate the operation of, various execution modules depicted in FIG. 1A. These modules may include, for example, customer storefront API, advisor partner API, product provider connectors API, Engagements Processing Ring (EPR) 130, Fiduciary Alignment Ring (FAR) 140, and various of databases. The customer storefront API, advisor partner API, product provider connectors API may facilitate communication between the client nodes 102, 106 and/or product provider B2B connectors 110 with the server platform 120. The EPR 130 may receive data associated with customers, market, financial products, user engagement activities, and the like from client nodes 102, 106, product provider B2B connectors 110 and/or third-party sources. These information may be stored in various databases and processed by EPR 130 to provide downstream functionalities. Processes performed by EPR 130 are described in further detail with reference to FIG. 2. The FAR 140 may coordinate with EPR 130 to provide recommendations for the workflow for financial advisors. Examples of the recommended workflow may include, without limitations, a list of financial products suitable to a customer based on a number of factors associated with the financial products and the customer, a list of investment strategy adjustment options to improve financial returns within customer risk tolerance range, a list of recommended goals to include in a financial plan, a recommended channel and/or time, date to contact the customer for better engagement, a record of prior communications between other financial advisors and this customer, etc. Processes performed by FAR 140 are described in further detail with reference to FIG. 2.

At least some of the embodiments described herein with respect to the system 100 of FIG. 1A provide various techniques for generating, and delivering information to client nodes, such as communicative data units which are engageable, by user input, user activity, and/or user response. For example, the communicative data units may comprise an interactive graphical element (e.g., button) that is engageable by user activity, such as, enrolling in a financial product, reviewing financial performance, presenting information associated with a financial product, etc. In some instances, the system 100 may provide, via advisor side client nodes 106, to financial advisors, a set of recommended actions to take for a customer, such as recommending a particular financial product to customer A because of a life event associated with customer A. In some embodiments, the communicative data units may be set for delivery at a future date and may have an expiration date. These dates associated with communicative data units may be stored in the system 100 at, for example, the server platform 120 or on the client nodes 102 and/or 106. In some embodiments, the logic or instructions related to the delivery timing associated with the communicative data units may be saved locally on the client nodes associated with a customer or an advisor. For example, the system 100 may proactively send a list of subsequent recommendations of possible actions to an advisor when the advisor recommended a financial product to a customer, wherein these subsequent recommendations are the possible actions following an acceptance of the recommended financial product. In some embodiments, the communicative data units may have a graph data structure, wherein the possible follow-on action and further communications may be linked to an already recommended action. This may allow the client nodes to provide real-time or near real-time directory to enable the advisors to respond to customers during an interaction. For example, if the recommended action is to buy Bond A, and the follow-on recommendations are sent to the client node associated with the advisor, then once the customer accepts this recommended action and purchased Bond A, the communicative data unit received and saved locally on the advisor's client node may provide/present the list of recommendations following a customer's acceptances of buying Bond A. By eliminating the communication process to the server for further advice/recommendations, the locally-saved subsequent recommendations associated with the communicative data units may improve user experience, i.e., by providing recommendations in real-time or near real-time.

Figure 1B:
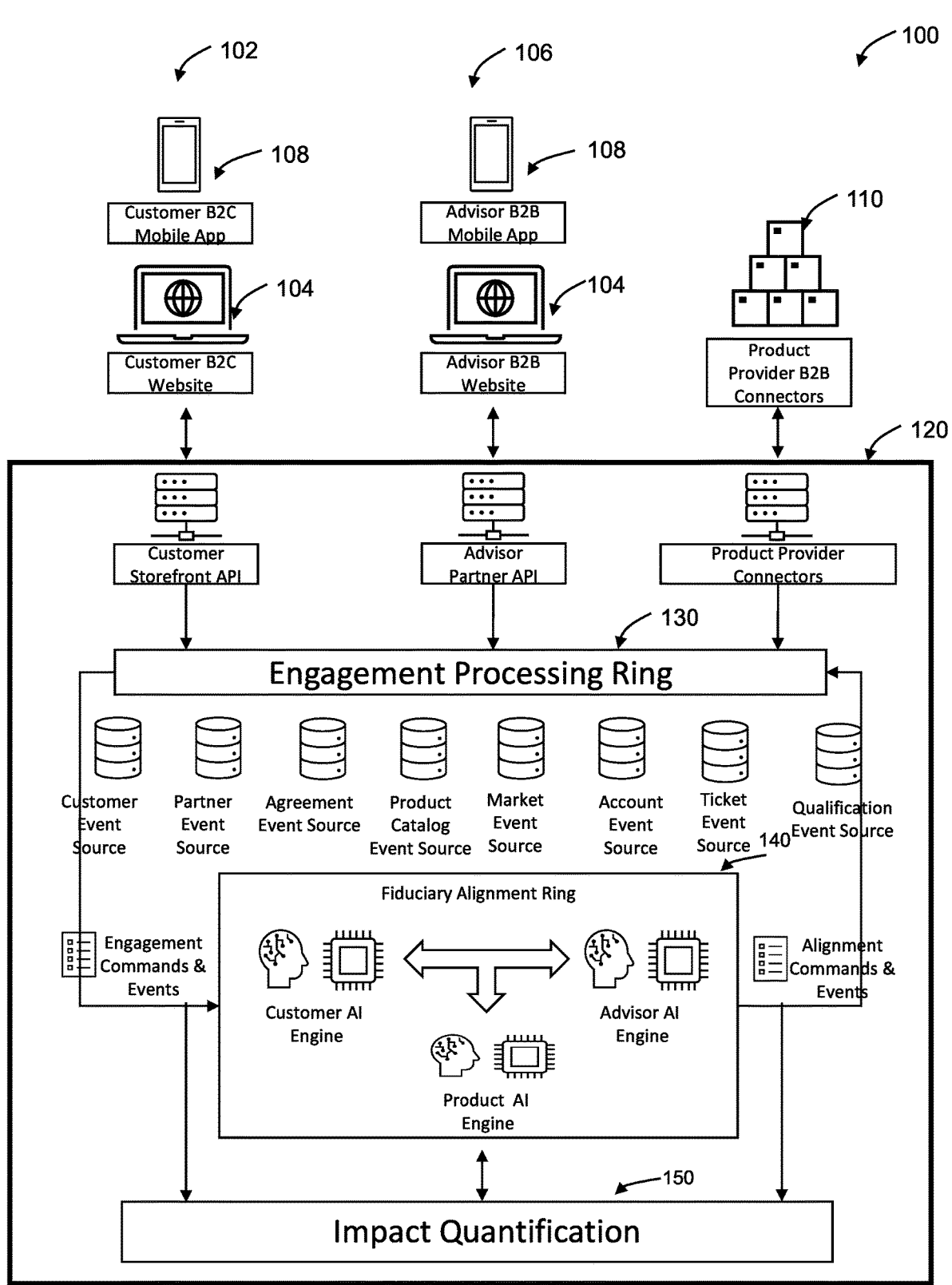
FIG. 1B schematically illustrates a block diagram of an exemplary system for managing workflow including the ability to manage workflow strategy and activity, provide suggestions to optimize workflow strategy and activity, and provide quantifiable impact resulting from suggested workflow strategy and activity optimization.

FIG. 1B schematically illustrates a block diagram of an exemplary system for managing workflow including the ability to manage workflow strategy and activity, provide suggestions to optimize workflow strategy and activity, and provide quantifiable impact resulting from suggested workflow strategy and activity optimization. As shown in FIG. 1B, the system 100 may further comprise an impact quantification module 150. In some embodiments, the impact quantification module 150 may record the recommendations proposed by the FAR 140, and/or utilize EPR 130 to monitor for actions performed based on the recommendations. The impact quantification module 150 may identify events that are required to implement the recommendations, and quantify the impact of recommendation on product performance, risk exposure, return rate, etc. In some embodiments, the impact may be in a form of portfolio gain/loss because of the implementation of the recommendation. In some embodiments, the impact may be in a form of timeline to achieve a financial goal adjusted because of the implementation of the recommendation. In some embodiments, the impact is indicative of portfolio performance. In some embodiments, the impact is indicative of the difference between portfolio performances across different implementation scheme of the recommendations. Processes and details related to impact quantification module 150 are described in further detail with reference to FIG. 1C.

Figure 1C:
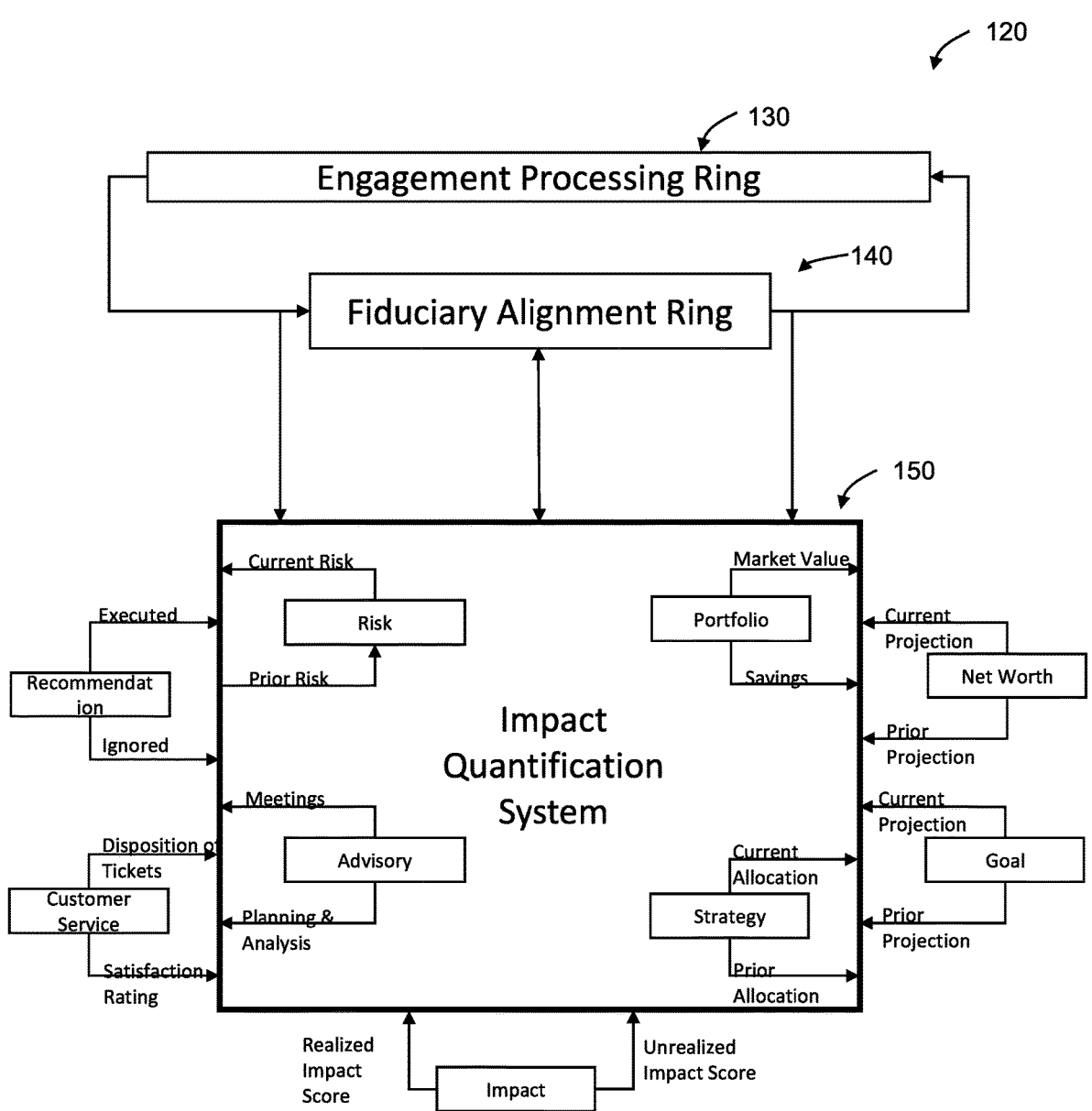
FIG. 1C schematically illustrates a block diagram of an exemplary system for managing workflow including the ability to provide quantifiable impact resulting from suggested workflow strategy and activity optimization with detailed illustration of an impact quantification module.

FIG. 1C a flow diagram depicting an example process for managing workflow including the ability to manage workflow strategy and activity, and provide suggestions to optimize workflow strategy and activity with detailed illustration of an impact quantification module 150. A recommendation module of the impact quantification module 150 may store one or more or all of the recommendations provided by FAR 140. In some embodiments, the recommendation module may record whether the recommendations are implemented or ignored by utilizing the EPR 130 to monitor for related actions or inactions by customers, advisors, and product providers. A risk module of the impact quantification module 150 may analyze risk deviations and trajectory through various data points, such as, changes to product selection, agreements completed, market movement, etc. A portfolio module of the impact quantification module 150 may access changes to associated portfolio data. Examples of the portfolio data may include, without limitation, financial instrument holdings, asset class allocation, strategy changes, account transactions, etc. The net worth module of the impact quantification module 150 may aggregate customer assets and illustrate trajectory of net worth to current product mix (i.e., product selection, customer portfolio under management, etc.) in comparison to simulated net worth based on the prior period's product mix. A goal module of the impact quantification module 150 may calculate the time horizon to achieve a pre-defined financial goals (e.g., set by a customer, set by default, etc.). In some embodiments, the goal module may ascertain a causation of the detected deviations. A strategy module of the impact quantification module 150 may evaluate whether strategy changes are connected and aligned to FAR 140 recommendations. The customer service module of the impact quantification module 150 may monitor business process efficiency and customer satisfaction based on FAR 140 recommendations for operational improvements. The impact module of the impact quantification module 150 may aggregate metrics and insights from all the impact quantification module 150 and generate scores for the overall impact of each implemented and ignored FAR 140 recommendations. The recommendation impact score may comprise product alignment, strategy alignment, financial uplift, risk operational efficiency, etc. In some embodiments, the impact quantification module 150 may transmit impact scores to FAR 140 for further improvement of recommendation effectiveness. In some embodiments, the impact score may further comprise narratives that may provide insights to the impacts that the recommendation may have brought. For example, the narratives can be "Custom A is now able to retire at age 65 instead of age 67 because he switched from portfolio A to portfolio B at 7 months ago based on FAR 140's recommendation", "Customer B would have lost 5% of the capital, but instead, he only lost 3% of the capital, because of a recommendation FAR 140 provided 3 months ago", etc.

Figure 2:
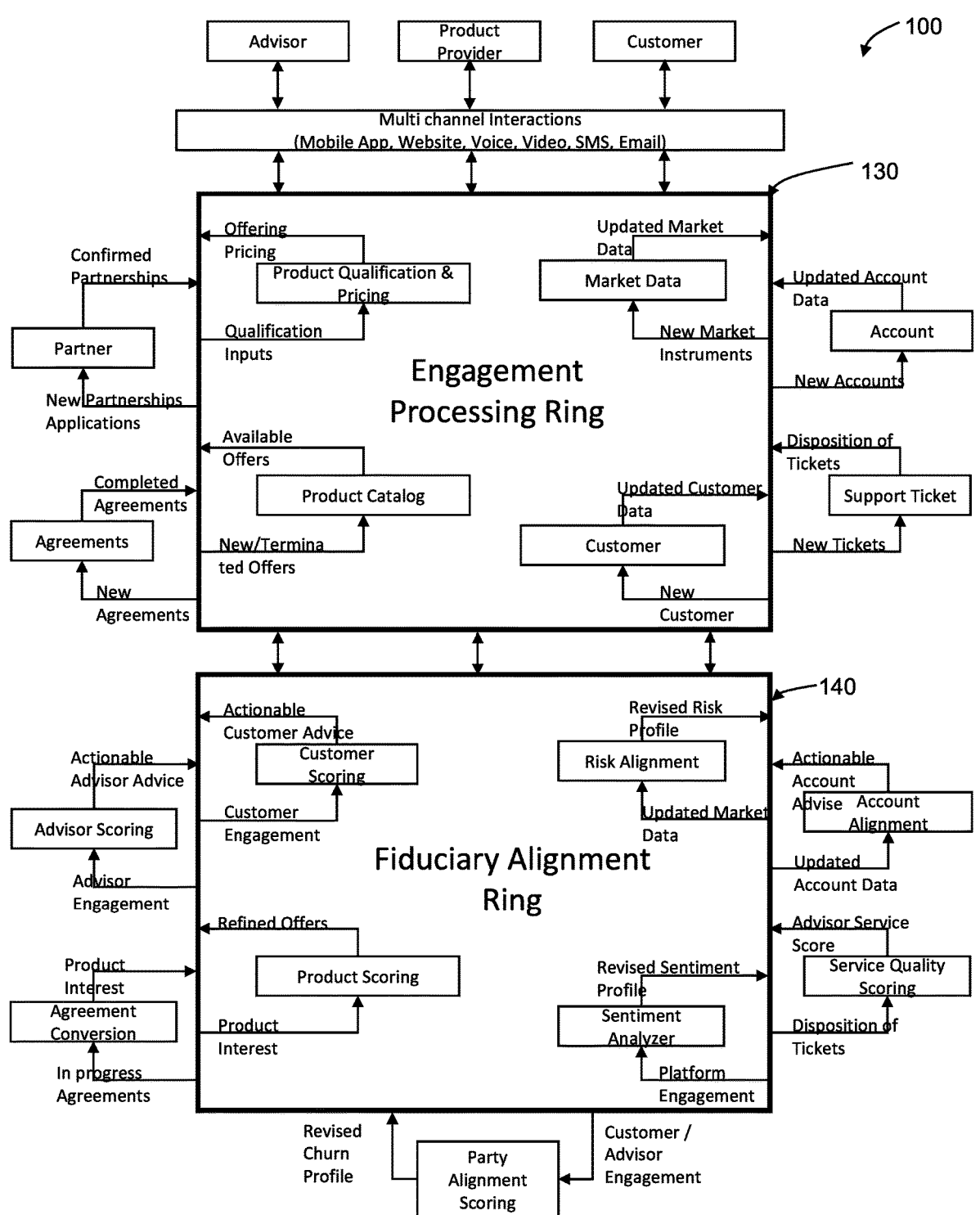
FIG. 2 is a block diagram depicting an exemplary system for managing workflow including the ability to manage workflow strategy and activity, and provide suggestions to optimize workflow strategy and activity, according to one exemplary embodiment.

FIG. 2 is a block diagram depicting an exemplary system 100 for managing workflow including the ability to manage workflow strategy and activity, and provide suggestions to optimize workflow strategy and activity, according to one exemplary embodiment. The EPR 130 may coordinate with the FAR 140 to provide various functionalities of the system 100. The EPR 130 may be implemented in one or more computing devices or systems, storage devices, and other components that include, or facilitate the operation of, various execution modules depicted in FIG. 2.

The EPR 130 may host a plurality of components. For example, as shown in FIG. 2, the EPR 130 may host a product qualification and/or pricing component which is configured to authenticate product qualification and provide product offering pricing. The EPR 130 may be in communication with the product provider B2B connectors 110 as shown in FIG. 1A to receive qualification inputs from product providers. The EPR 130 may host a list of partners by receiving new partnerships applications and confirm partnerships. The EPR 130 may host a product catalog component which manages financial product offers. This product catalog may be updated in real-time or near real-time when a new product is added to the system, or an offer of product is terminated/expired. The EPR 130 may host an agreements component which is configured to automatically update the agreements when there is a new agreement executed and transmit the completed agreement to the system 100 regarding the completed agreements. The EPR 130 may host a market data component which is configured to monitor and receive new market instruments and update market data in real-time or near real-time. In some embodiments, the EPR 130 may automatically process market data to generate predictions by utilizing a machine-learning algorithm. In some embodiments, the EPR 130 may fetch news related to the market and utilize a machine-learning algorithm to analyze potential impacts to financial products. The machine-learning algorithm may be trained to process natural language, market index, numbers, and other different types of data to generate a prediction of the market trend. In some embodiments, the prediction may indicate a market trend, impacts on a set of financial products, etc. In some embodiments, the prediction may be a textual output, for example, "the increase of interest rate may affect the outlook of stock A". In some embodiments, the prediction may be a score output, for example, in a scale of 1-100, 1-10, 1-5, etc. The EPR 130 may host an account component which is configured to add new accounts when they are created and update the account database. In some embodiments, account data associated with accounts may comprise instrument holding, balances, performance, posted transactions, etc. The EPR 130 may host and maintain a customer database by adding new customers and updating the customer database. In some embodiments, the customer data associated with customers may comprise demographics, credit rating, risk tolerance, political affiliations, etc. The EPR 130 may host support ticket database and record new tickets and disposition of tickets. The above-described data may be analyzed and utilized by the EPR 130 to provide downstream functionalities. In some embodiment, the EPR 130 may aggregate the data and generate normalized data sets. There are various methods to aggregate and normalize data. In some embodiments, the mechanism for normalizing data sets may be selected based on the characteristic of the data sets, the purpose of use of the data sets, the intended output format of the data sets, etc. Machine-learning algorithms are utilized to study these data sets and provide insights into the data sets. In some embodiments, the EPR 130 may receive and store events from various components (e.g., the components described in connection with FIG. 1A). In some embodiments, a list of events may be received in a sequential order and is stored in a timeseries datastore. The timeseries datastore may comprise logic and instructions to normalize the received data set. Data stored in a timeseries datastore may be associated with timestamps, and the timestamps and the association with the events may provide insights to the machine-learning models and may be utilized to generate recommendation throughout a customer's tenure with the system. The EPR 130 may transmit these data sets to FAR 140 for further processing.

The FAR 140 may comprise a plurality of modules. As shown in FIG. 2, a customer scoring module of the FAR 140 may generate customer scores based on the customer data. Examples of the customer data may include, without limitation, demographic information of the customer, financial management goals, risk tolerance level, etc. The customer score may be calculated using different weights for different factors. Alternatively or additionally, the customer scoring module may generate actionable customer advice based on the calculated customer score. Examples for the actionable customer advice may include, without limitation, "you may consider choosing low-risk financial products because of your risk tolerance level", "you may consider switching to product B from product A because product B fits your overall financial goal better based on your risk tolerance score", etc. In some embodiments, the customer score may be generated/calculated using ensemble models embedded with various machine-learning techniques. For example, a decision tree may be trained and utilized to generate predictions. In some embodiments, a classification algorithm may be utilized to weight the generated predictions to generate a final score as the ensemble model output. The predictions, weights associated with the predictions and customer score may be utilized to match users, advisors, and the products. In some embodiments, the weights may be adjusted by comparing the predictions with the actual recommendations made by the advisors and/or the actual resultant action (e.g., accept the recommended product, reject the recommended product, choose a different product than the recommended product, choose a similar product as the recommended product, etc.) made by the customer.

An advisor scoring module of the FAR 140, as shown in FIG. 2, may generate advisor scores based on advisor engagement data. Examples of advisor engagement data may include, without limitation, financial advisor's specialties, geographical service areas, feedback from previous customers, engagement efficiency monitored by the system, average returns on the advice given to customers, average risks associated with products recommended to customers, fiduciary alignment level to customers stated goals and risk capacity, etc. The advisor score may be calculated using different weights for different factors. For example, the advisor score may be a weighted sum of the factors. Alternatively or additionally, the advisor score may be calculated utilizing a machine-learning algorithm. The machine-learning algorithm may be trained by training samples to determine the respective weight for different factors. For example, a set of similar advisors and the associated advisor scores may be fed to the machine-learning algorithm. In some embodiments, customer's feedback and rating may be fed to the machine-learning algorithm for continuous training and updating. The advisor scoring module may generate actionable advisor advice based on the calculated advisor score. Examples for the actionable advisor advice may include, without limitation, "you may consider following up more often with customer A because your communication score is low", "you may consider improving your business operational processes because your business operation score is below a threshold", etc. In some embodiments, the advisor engagement data may be stored in a timeseries datastore, wherein the data is associated with timestamps. In some embodiments, the system may weigh the engagement data and/or its relevancy based on the timestamps. For example, a positive customer feedback on the advisors during market downturn may be given more weight/importance than positive customer feedback during other times. Additionally or alternatively, ensemble models may be used to calculated advisor score. For example, results of a decision tree may be compared to the output from other analyses, for example, from sentiment analysis. In another embodiment, results from a decision tree may be compared to the output from a trained machine learning model (e.g., a neural network) to generate accurate and human readable advice. In some embodiments, the large number of data attributes associated with an advisor may be reduced, by aid of analysis model and/or machine learning model, thereby to generate a dimensionality-reduced data set. The dimensionality-reduced data set may help generate reliable and stable results, for example, in the advisor score calculation process.

A product scoring module of the FAR 140, as shown in FIG. 2, may generate product scores based on product interest data. The product scoring module may generate refined offers based on the product score. For example, if a product score is lower than a threshold, the product scoring module may reduce the offer price of the product to make it more attractive. In some embodiments, the product scoring module may store the received product interest data in a timeseries data structure, and may apply a decay function to the product interest data. For example, a recently-generated product interest may be weighted higher than an older product interest. In some embodiments, the decay function may be trained by a machine-learning model. An agreement conversion module of the FAR 140, as shown in FIG. 2, may generate agreement conversions based on in-progress agreements (e.g., an agreement that is not finalized but in the process of being finalized). The agreement conversion module may generate product interest and, in some embodiments, feed the product interest to the product scoring module. A risk alignment module of the FAR 140, as shown in FIG. 2, may generate risk alignment based on updated market data. The risk alignment module may generate a revised risk profile based on the risk alignment. For example, the updated market data may indicate that Bond A's risk level has been lower because of various reasons, then the risk alignment module may update the risk alignment and indicates that because of the change of Bond A's risk level, it is now within Customer B's risk tolerance range and can be recommended to Customer B. In some embodiments, an ensemble model with classifiers may be utilized by the risk alignment module. The classifiers may generate risk classifications. In some embodiments, an account outlook forecasting model may be utilized. In some embodiments, the account outlook forecasting model may utilize the risk classifications to provide a balancing act for account exposure re-alignment. An account alignment module of the FAR 140, as shown in FIG. 2, may generate account alignment based on updated account data. The account alignment module may also generate actionable account advice. Examples for the actionable advisor advice may include, without limitation, "you may consider withdraw the unused cash from your account because X amount has been not used for Y period of time", etc. In some embodiments, a machine learning model is trained to generate recommendations for account alignment based on the account changes made by the customer, adjusted by the risk score, and other factors affecting the account balances due to market fluctuations predictions. A service quality scoring module of the FAR 140 may generate a service quality score based on the disposition of the tickets. The service quality scoring module may then generate an advisor service score based on the service quality score. This adviser service score may be fed to the advisor scoring module, as described elsewhere herein, to generate and/or revise the advisor score. In some embodiment, a machine-learning algorithm may be trained to classify the generated tickets into multiple sentiment categories. In some embodiments, based on the category (e.g., importance of an category, etc.), the scores of the tickets are weighted accordingly, and then an advisor score may be generated/calculated as the sum of the weighted scores. In some embodiments, a number of parameters may be fed into the machine-learning algorithm, for example, the resolution to the ticket, the time taken to reach to a resolution, the customer rating for the resolution, the net change to the account after the resolution of the ticket, etc. In some embodiments, the scores of tickets may be generated by correlating to the outcome of the customer account, for example, if a resolution of a ticket leads to a profit of the customer account, then the score associated with the ticket is high. In another example, a resolution of neutral on a missed trade type ticket may carry a high negative score, if the system detects high churn associated with this or similar type of tickets and resolution.

A sentiment analyzer of the FAR 140, as shown in FIG. 2, may generate sentiment analytics based on the platform engagement data. Examples of the platform engagement data may include, without limitation, how inclined a customer is to purchase a particular type of financial product, what the financial products a customer's family members, close friends, colleagues, and/or acquaintances are purchasing (thus more likely be in the conversations between them and the customers), how often a customer reviews and reacts to a notification, what are the best time periods and manners to contact a customer (e.g., during 7-8 pm in a workday via phone call), etc. The platform engagement data may be obtained by collecting customer input data, parsing data and extracting a pattern associated with customer's actions, etc. This sentiment analyzer may utilize a machine-learning algorithm to analyze past interactions with a customer and/or a group of customers to provide a revised sentiment profile associated with this customer. In some embodiments, the sentiment analyzer may synthesize the platform engagement data in order to provide insights into the sentiment. In some embodiments, the platform engagement data are stored in a timeseries database, with timestamps associated with each set of the engagement data. In some embodiments, the timestamps may be utilized to provide insights into sentiment. For example, the time between a market downturn and a purchase of a low-risk fund may contribute to sentiment data of a customer and may provide actionable insights, for example, it may indicate that a customer is very risk-adverse, pay close attention to the market, and may act fast/slow (e.g., depending on the time in between).

The system herein may comprise a dynamic network of a plurality of AI engines (e.g., customer AI engine, advisor AI engine, product AI engine) acting in parallel, which consistently act and react to other engines' action at any given time and/or over time, which actions may be based on detected, inter-relational dynamics as well as other factors leading to more effective actionable value. The FAR 140 may provide alignment, coordination and convergence of AI outputs for purposes of generating desired converged optimal outcomes and results. In some embodiments, the one or more AI engines may be deployed using a cloud-computing resource which can be a physical or virtual computing resource (e.g., virtual machine). In some embodiments, the cloud-computing resource can be a storage resource (e.g., Storage Area Network (SAN), Network File System (NFS), or Amazon S3.RTM.), a network resource (e.g., firewall, load-balancer, or proxy server), an internal private resource, an external private resource, a secure public resource, an infrastructure-as-a-service (IaaS) resource, a platform-as-a-service (PaaS) resource, or a software-as-a-service (SaaS) resource. Hence, in some embodiments, a cloud-computing service provided can comprise an IaaS, PaaS, or SaaS provided by private or commercial (e.g., public) cloud service providers. In some embodiments, the outputs from different AI engines may be aggregated and/or combined, for example, using a weighing, voting, and/or weighted voting function.

A party alignment scoring module of the FAR 140 may calculate a party alignment score based at least on customer/advisor engagement data. In some embodiments, the party alignment scoring module may match one or more customers with one or more advisors based on a number of factors, including, without limitation, past engagement/interactions between customers and advisors, customer score (e.g., risk tolerance score, overall wellness score, and the like), advisor score, etc. In some embodiments, the party alignment scoring module may generate an alignment score indicative of a match between one or more customers and one or more advisors and may determine a match when the alignment score exceeds a threshold or a customer pre-defined minimum score. The alignment score may be generated based on the plurality of factors such as past engagement/interactions between customers and advisors, customer score (e.g., risk tolerance score, overall wellness score, and the like), advisor score, as described above. In some embodiments, the factors to determine a match may comprise a risk preference or risk tolerance. For instance, party alignment scoring module may match one or more customers with one or more advisors when a risk preference of the advisor (e.g., generated by the risk rating associated with the products that this advisor often provide to customers) is within the customer's risk tolerance range. In some embodiments, the factors to determine a match may comprise a return rate of a product. For instance, party alignment scoring module may match one or more customers with one or more advisors when a return rate associated with products that an advisor recommended is within a desire/pre-define return rate of the customer. In some cases, a match may indicate an advisor, a company, a solution, optimal choice, a product, matched to the user based on the factors described above. For example, a match may indicate a three-way match, for example, it may indicate Advisor A matches with Customer B in the setting of recommending Product C. This three-way match may consider a plurality of factors/parameters/characteristics/propensities associated with the customer, the advisor, and the product. The party alignment scoring module may generate a revised churn profile which indicates a match between one or more customers with one or more advisors, and with the products as well. In some embodiments, a machine-learning model may be trained on training data set from past matching results. For example, a label of matched or not matched may be associated with the data set comprising the information associated with a customer, an advisor, and a product. The training data set may be in a graph data structure, wherein the nodes may denote a customer, an advisor, and the edge linking the nodes may denote a value of the traits of the product. Alternatively or additionally, the edge linking the nodes may indicate a matched relationship. In some embodiments, the nodes may each denotes a product, an advisor, and/or a customer, and a closed loop triangle among 3 nodes from one product, one advisor and one customer may indicate a three-way match past result, and may be fed to the machine learning model as training data set. The three-way match may indicate that there was a match between the customer and the advisor for that product.

In some embodiments, as described herein elsewhere, the platform engagement data may be stored in a timeseries database with timestamps, and the party alignment scoring module may apply a decay function to platform engagement data to adjust the churn profile. For example, if a customer made a big investment subsequent to a number of smaller investments recommended by an advisor, this may indicate a low probability of churn rate associated with this customer.

The party alignment scoring module and/or the sentiment analyzer may comprise a trained classifier/model to determine a match, extract sentiment (e.g., positive sentiment towards a product or company), or identify relationships such as business relationships. The party alignment scoring module or the sentiment analyzer may utilize any suitable machine learning and semantic techniques (e.g., Natural Language Processing, interpretation and understanding, cognitive computing and pattern recognition, big data & predictive analytics, real-time processing, deep learning, deep neural networks (DNNs), computer vision, machine vision, automated speech recognition (ASR), Recurrent Neural Networks (RNNs), Supervised, Unsupervised and Reinforcement Learning, Generative Adversarial Networks (GANs), Convolutional Neural Networks (CNNs) and other deep learning techniques). Semantic techniques may include semantic search, convergence, process matching/mapping, knowledge engineering and knowledge graphs, taxonomy management, text mining, ontology management or any other ontology matching technique (e.g., techniques that relies on semantic information encoded in lightweight ontologies to identify nodes that are semantically related). Alternatively or additionally, a plurality of techniques described above may be utilized simultaneously to generate independent results, and then the system may aggregate/combine the results by voting, weighing or weighted voting (i.e., ensemble modeling).

The FAR 140 may utilize a machine-learning algorithm to provide scalable, integrated recommendations that help financial advisors to provide customized suggestions of financial products to a particular customer that fit the customer's goal and current status. This FAR 140 may also utilize a machine-learning algorithm to provide updated recommendations based on customer's life events, market changes, and the like. In some embodiments, the FAR 140 may provide recommendations to financial advisors regarding how to better engage with a customer. In an example, the FAR 140 may match a financial advisor A with a customer B based on the party alignment score (e.g., the party alignment score between financial advisor A and customer B exceeds a predetermined threshold). Once matched, the FAR 140 may notify both the financial advisor A and customer B of the match (e.g., by sending a notification to client nodes associated with financial advisor A and customer B). The FAR 140 may then transmit to financial advisor A information associated with customer B; the information may include, without limitation, customer B's demographic information, current wellness score, risk score, financial goals, net asset and allocation of the asset, etc. In some embodiments, the FAR 140 may utilize machine-learning, neural networks, and/or ensemble modeling to deduce an optimal allocation of customers to advisors by balancing customer need with advisor capacity. For example, if Advisor A has already taken on a large number of customers and has limited bandwidth, and Customer B's needs on financial advice is extensive, then Advisor A may not be recommended/matched with Customer B. In another example, the system may preferably match financial advisors who have abundant bandwidth with new customers. In some embodiments, the system may dynamically move customers from one advisor to another in order to accommodate advisors' bandwidths and capacities.

The FAR 140 may then transmit a list of recommended financial products that suit customer B's profile to financial advisor A. The list of recommended financial products may be generated by machine learning algorithms of the FAR 140 by taking the characteristics of the financial products and customer B's profile. For example, the characteristics of the financial product may comprise risk rating, estimated return rate, etc, and the customer's profile may include parameters or preference that indicate the customer's risk tolerance level, desired return rate, etc. Alternatively or additionally, the FAR 140 may also provide an explanation for recommending this list of financial products, e.g., "this product may have higher risk but yields high potential returns; customer B is single with no kids, no student loan and no mortgage, this may be a product he/she is interested in", "this product is low risk with stable returns, customer B has three kids and thus may be interested in this product". Further, the machine-learning algorithm of FAR 140 may also learn from the customer B's profile and past interactions to predict an engagement rate for different communications channels (e.g., mobile app, website, phone calls, emails, SMS, etc.) during different time periods of a day or a particular day of a week. The FAR 140 may provide communication recommendations to financial advisor A based on the engagement prediction. For example, if customer B generally ignores email notifications, but always answers phone calls during workday evenings, the FAR 140 may transmit this information to financial advisor A to better engage with customer B.

It should be noted that the system 100 is also monitoring changes of the market data and customers' life events to provide updates and changes of recommended financial products. For example, if customer B reported expecting a new-born baby in the coming months, the FAR 140 may adjust customer score (e.g., a wellness score, a risk tolerance score, or a combination of wellness score and risk tolerance score) for customer B, and this adjusted customer score may trigger a change of recommended financial products. The machine-learning algorithm of the FAR 140 may learn from other customers with similar profiles and went through similar life events to provide predictions regarding what financial products should be recommended to customer B. This new recommendation may be provided to financial advisor A for further review and then communicated to customer B.

FIG. 3 is a flow diagram depicting an example process 300 for managing workflow including the ability to manage workflow strategy and activity, and provide suggestions to optimize workflow strategy and activity, according to one exemplary embodiment. As depicted in FIG. 3, the process 300 begins with operation 302, wherein the EPR 130 monitors events that may trigger portfolio adjustment in the customer's profile. For example, a customer's life change events are monitored. In some embodiments, the life change events may be pre-selected by a customer at the time of creating a profile. In some embodiments, the life change events may be set by the system default settings. If there is a detected life change event, the EPR 130 may trigger the customer scoring module. Examples for life change events may include a change of family structure, change of children's status (e.g., going to college), a change of primary asset (e.g., purchase or potential purchase of a new house), etc. In some embodiments, the life change events may be self-reported by the customers. In some embodiments, the life change events may be monitored and collected from other public records. In some embodiments, the life change events may be defined as any events that may warrant an adjustment to the customer's investment portfolio due to the changes. For example, a life change event may alter a customer's risk tolerance level, and therefore may warrant a portfolio adjustment.

The process 300 may then proceed to operation 304, wherein the customer scoring module may recalculate the wellness score for the customer. If the recalculated wellness score excesses a predetermined threshold, the process 300 may proceed to operation 306. In some embodiments, the wellness score may comprise risk tolerance score. In operation 306, the FAR 140 may generate recommendations on possible strategy and goal changes for the customer. For example, if the life change event is a potential purchase of a new house in the next 6 months, and the customer is short on the down payment, the recommended strategy and goal to this customer may be to move his investment from high-risk financial products to low-risk financial products. In some embodiments, this updated recommendation may be communicated directly with the customer via customer side client nodes 102. Alternatively or additionally, this updated recommendation may be communicated by a financial advisor to the customer. The process 300 may then proceed to operation 308, wherein the FAR 140 may generate an updated match of a financial advisor and a list of financial products based on the life change event. Next, the process 300 proceeds to operation 310, wherein the FAR 140 may generate possible updates to the customer profile based at least on risk score. The process 300 may proceed to operation 312, wherein the EPR 130 may notify the matched financial advisor to initiate engagement with the customer based on FAR recommendations. The manner (e.g., channel, time, frequency, etc.) for the engagement may also be provided to the financial advisor, as described herein elsewhere. In operation 314 of the process 300, the EPR 130 may initiate a communication with the customer to notify the customer that certain advisor(s) are assigned to him/her based at least in part on the advisor's expertise and the characteristics of the products recommended to him/her. In an optional operation 316 of the process 300, the impact quantification module 150 may generate an impact score of the implemented recommendations triggered by customer's life change event. It should be noted that not all the operations described herein are required to perform the functionalities provided by the platform and may be omitted. It should also be noted that some of the operations may be performed in different orders or in parallel with one another.

FIG. 4 is a flow diagram depicting an example process 400 for managing workflow including the ability to manage workflow strategy and activity, and provide suggestions to optimize workflow strategy and activity, according to one exemplary embodiment. As depicted in FIG. 4, the process 400 begins with operation 402, wherein the EPR 130 monitors market data to identify events that may trigger portfolio adjustment. For example, the events may comprise potential drawdown events. In some embodiments, the potential drawdown events may be pre-defined by the system, for example, an interest rate increase event, a scandal associated with a currency exchange platform, etc. The process 400 may then proceed to operation 404, wherein the risk management module of the FAR 140 may generate possible updates to the portfolio based on the potential drawdowns due to market conditions. Next, in operation 406, the EPR 130 may notify financial advisors to initiate engagement with customers based on the FAR recommendations for drawdown. Examples of the FAR recommendations may include a change of financial products. Alternatively or additionally, in operation 408, the EPR 130 may notify customers regarding the market condition and the effect of the market condition to the customer's portfolio. In an optional operation 410 of the process 400, the impact quantification module 150 may generate an impact score of the implemented recommendations to customer's sentiment and customer satisfaction in light of a market change (e.g., market downturn). It should be noted that not all the operations described herein are required to perform the functionalities provided by the platform and may be omitted. It should also be noted that some of the operations may be performed in different orders or in parallel with one another.

FIG. 5 is a flow diagram depicting an example process 500 for managing workflow including the ability to manage workflow strategy and activity, and provide suggestions to optimize workflow strategy and activity, according to one exemplary embodiment. As depicted in FIG. 5, the process 500 begins with operation 502, wherein the EPR 130 monitors new financial products in the market/platform. In some embodiments, the detection of a new product may warrant a portfolio adjustment, for example, because this new product fits a customer's financial goal and need better than the existing products in the customer's portfolio. If there is a new product detected, the process 500 may then proceed to operation 504, wherein the FAR 140 may generate a list of customers that may benefit if purchasing this new product. Next, in operation 506, the FAR 140 may look for new products that align with customers' goals and generate a list of customer and advisor match. The process 500 may then proceed to operation 508, wherein the FAR 140 may notify financial advisors to initiate engagement with customers based on the FAR recommendations for new products. Alternatively or additionally, in operation 510, the EPR 130 may notify customers about new products that best align to the customer's goals along with advisors that can serve them best. In an optional operation 510, the impact quantification module 150 may generate an impact score of the implemented recommendations to the customer's product interest, the affinity of product to similar customer segments, and direct contribution to advisor revenue. It should be noted that not all the operations described herein are required to perform the functionalities provided by the platform and may be omitted. It should also be noted that some of the operations may be performed in different orders or in parallel with one another.

Figure 6:
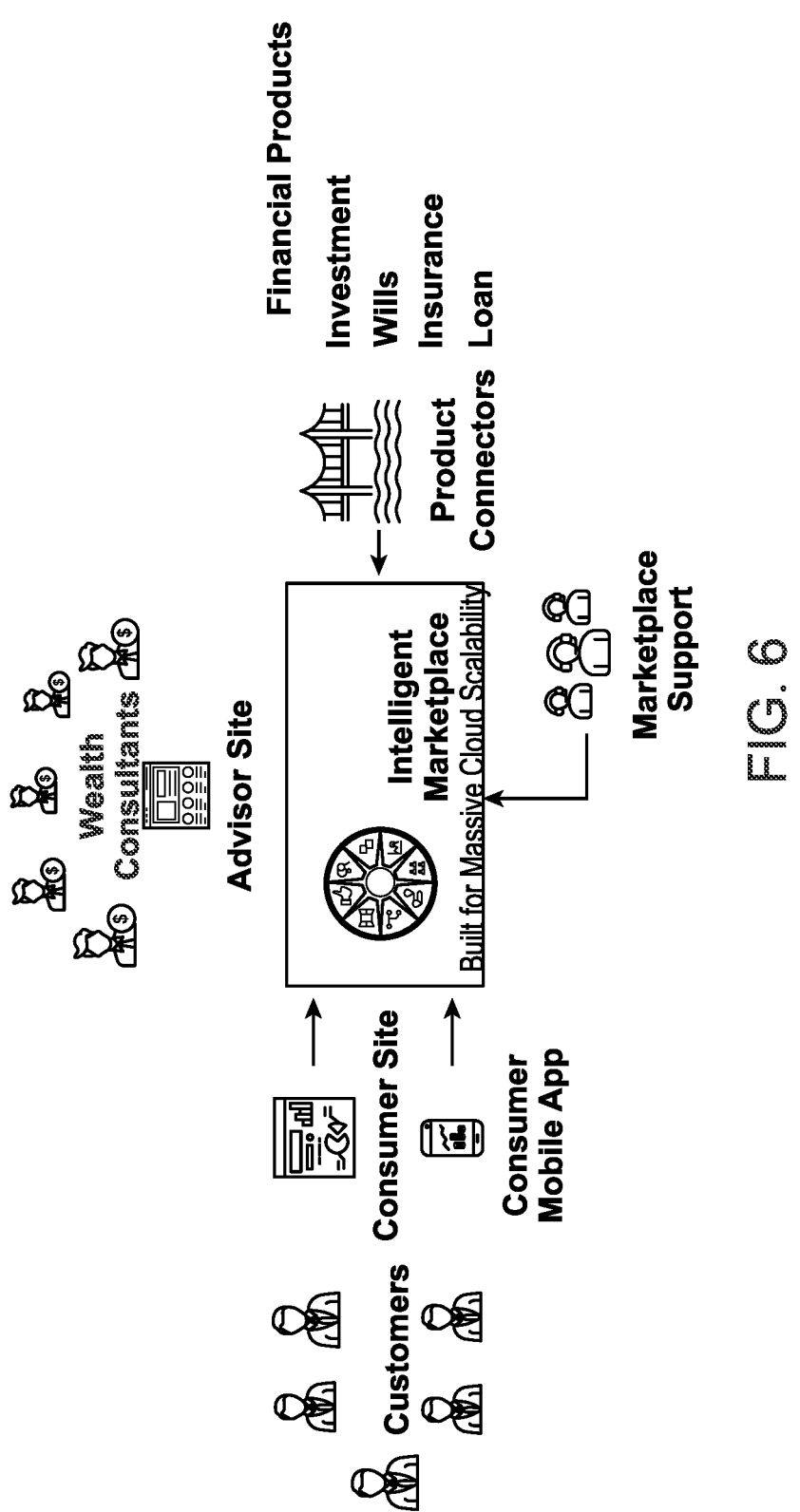
FIG. 6 is graphical representations of an example illustration of the functionalities and entities provided by various modules and platforms according to one exemplary embodiment.

FIG. 6 is graphical representations of an example illustration of the functionalities and entities provided by the server platform 120 of FIG. 1A, according to one exemplary embodiment. FIG. 7 is graphical representations of an example illustration of the advantages and benefits, without limitation, provided by the server platform 120 of FIG. 1A, according to one exemplary embodiment.

FIG. 8 is a graphical representation of an example illustration of the cloud native scalability provided by the server platform 120 of FIG. 1A, according to one exemplary embodiment. An event driven architecture is provided to facilitate distributed event processing across services to maximize data insights and business reactive processing. A micro-services scheme is provided to facilitate performant stateless services running upon containerized applications such as Kubernetes orchestration layer. A capability of extensions may facilitate integration framework to enable $3^{rd}$ party solutions to augment platform capabilities. A cloud infrastructure may provide automated provisioning of infrastructure, therefore allow for automated provisioning to meet business growth. A modern web technology may be utilized to enable high performance user experiences across different digital surfaces. The aggregation of these functionalities of the platform therefore enables auto scaling of services to react to user request volumes to sustain high performance.

Figure 9:
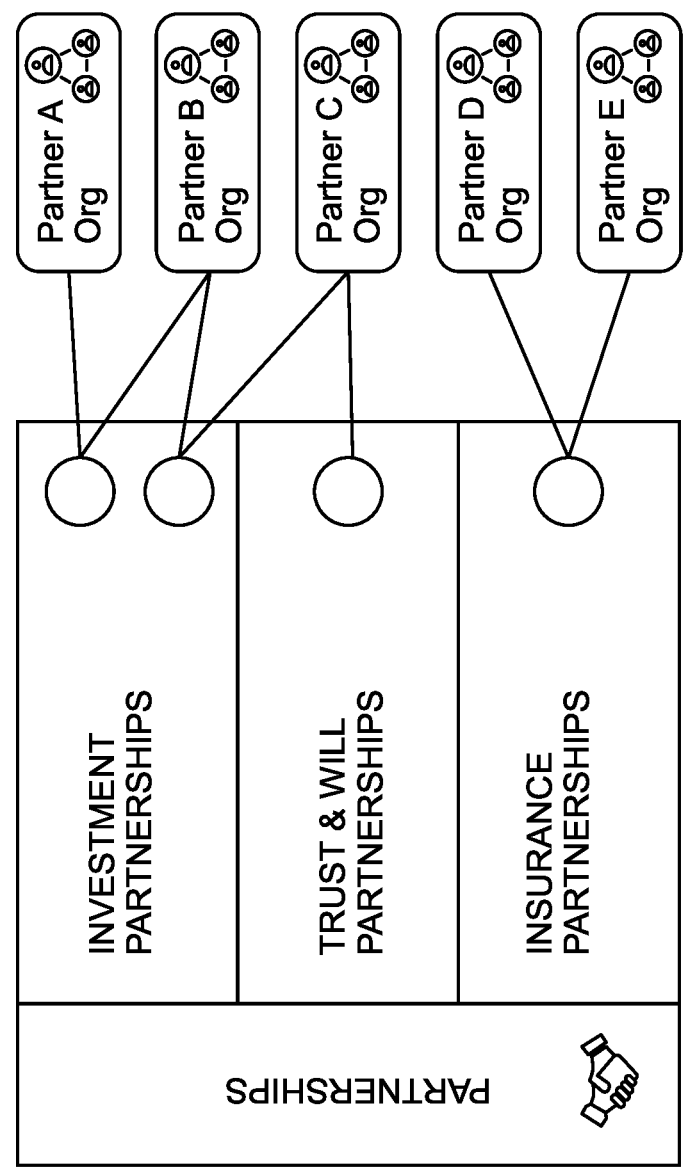
FIG. 9 is graphical representations of an example illustration of the marketplace enabled by various modules and platforms according to one exemplary embodiment.
Figure 10:
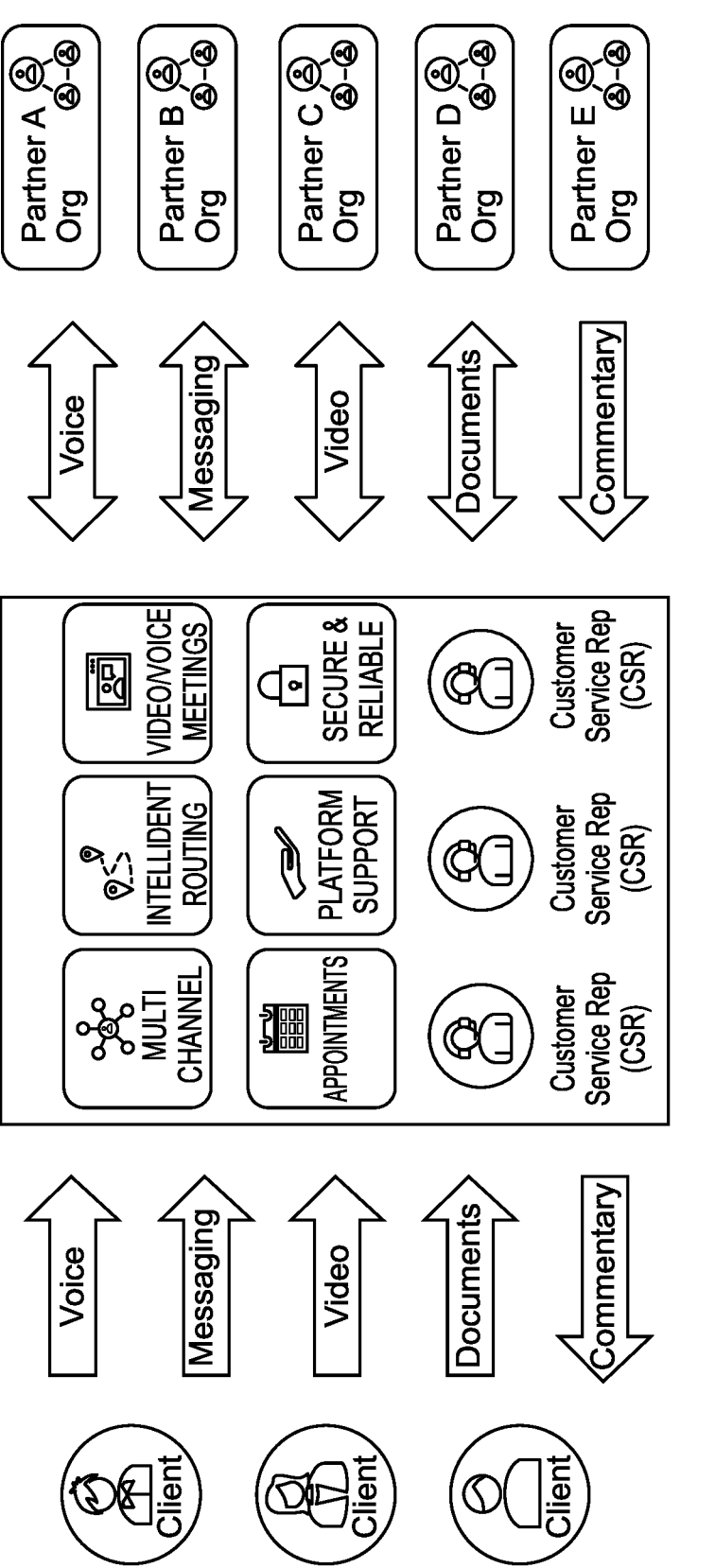
FIG. 10 is graphical representations of an example illustration of the conversational functionalities provided by various modules and platforms according to one exemplary embodiment.

FIG. 9 is graphical representations of an example illustration of the marketplace enabled by the server platform 120 of FIG. 1A, according to one exemplary embodiment. According to FIG. 9, the investment products, trust and will products, and the insurance products may be provided by investment partnerships, trust and will partnerships, and insurance partnerships across a number of organizations. FIG. 10 is graphical representations of an example illustration of the conversational functionalities provided by the server platform 120 of FIG. 1A, according to one exemplary embodiment. According to FIG. 10, the client may utilize multiple channels of communications to communicate with the platform 120 and a number of partners associated with the platform 120.

Figure 11:
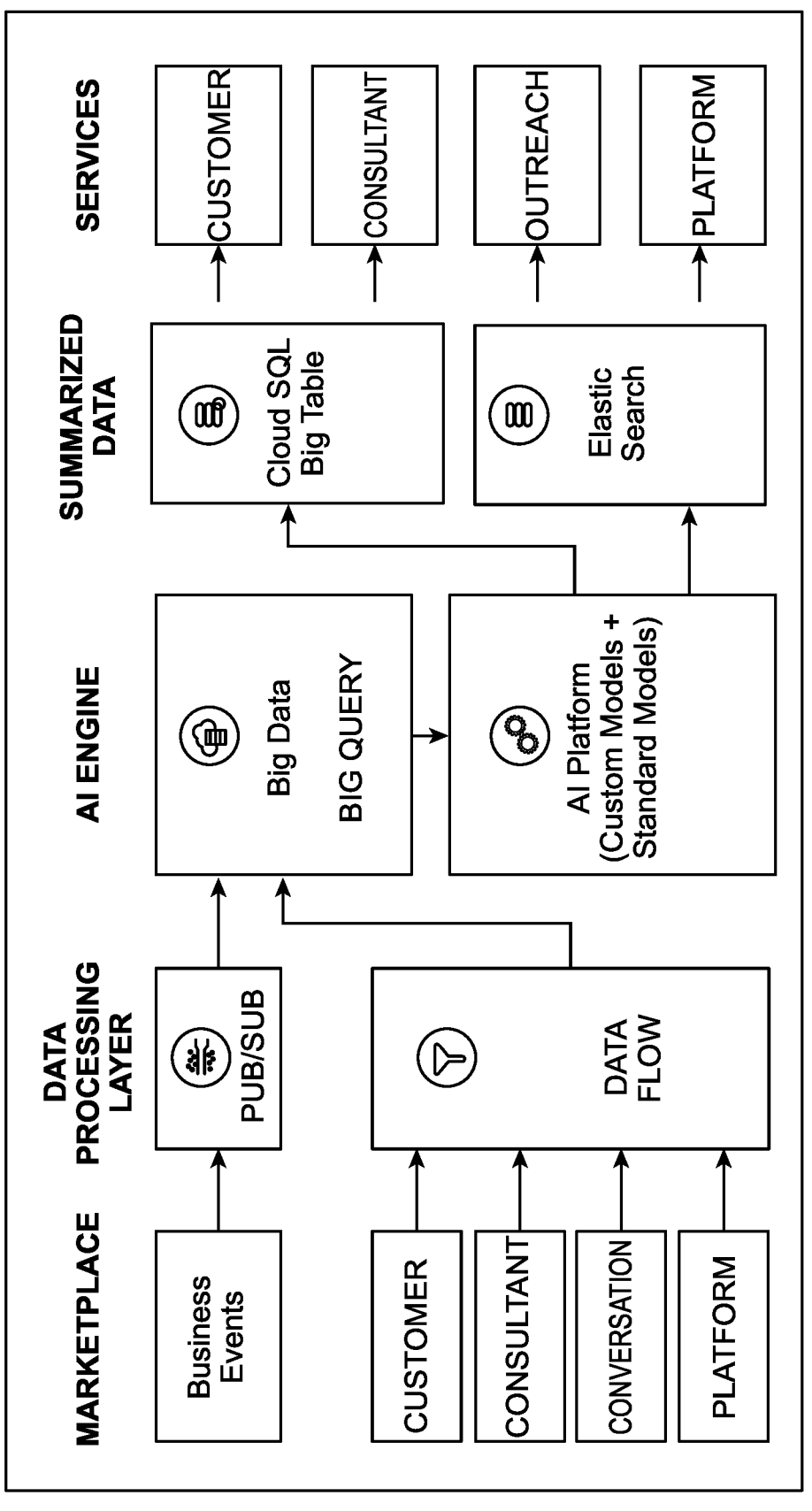
FIG. 11 is graphical representations of an example illustration of the architecture provided various modules and platforms according to one exemplary embodiment.

FIG. 11 is graphical representations of an example illustration of the architecture provided by the system 100 of FIG. 1A, according to one exemplary embodiment. According to FIG. 11, the system 100 may comprise marketplace, data processing layer, AI engine, summarized data, and services.

Figure 12:
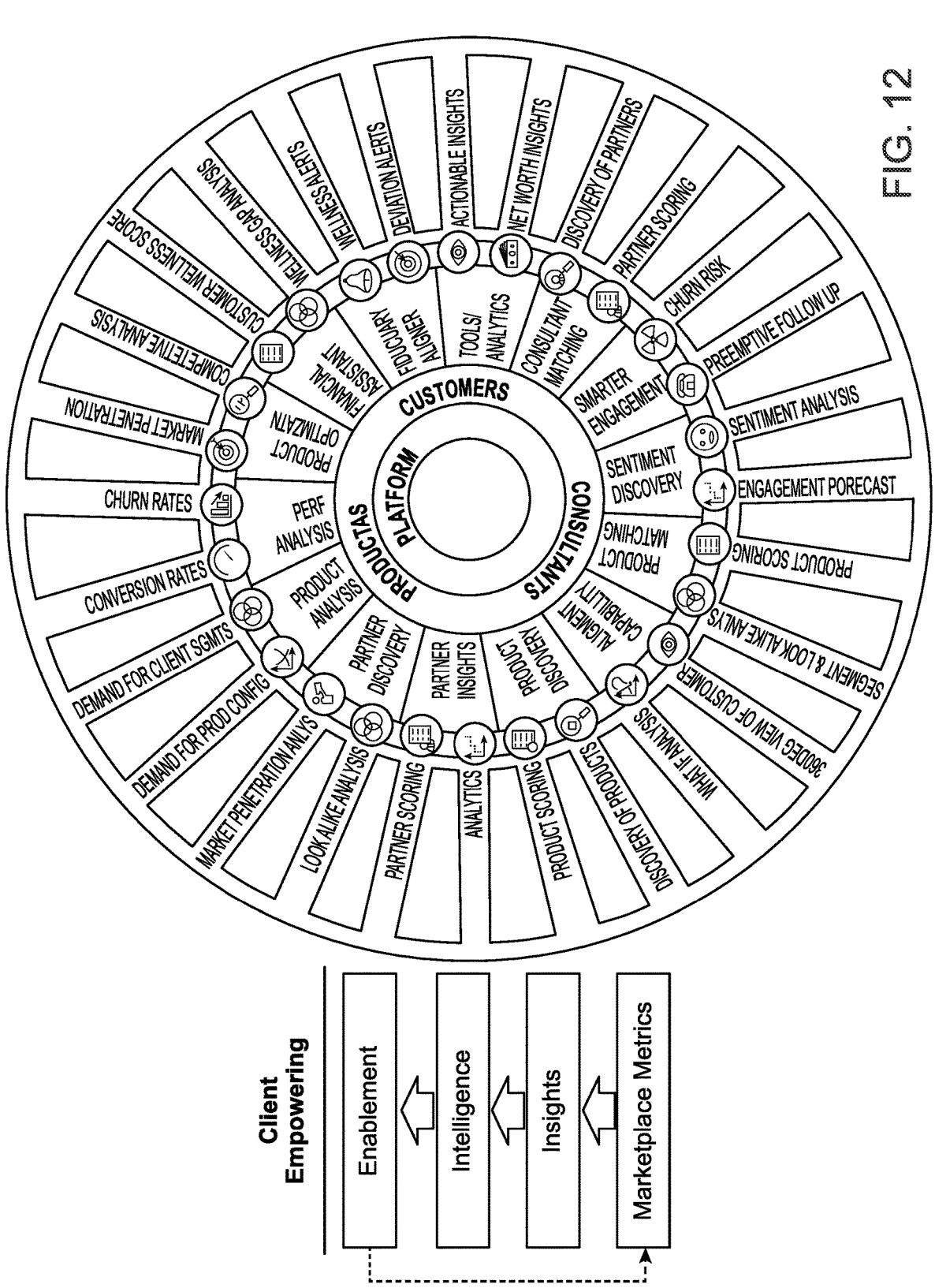
FIG. 12 is graphical representations of an example illustration of client empowering tools and functions provided various modules and platforms according to one exemplary embodiment.

FIG. 12 is graphical representations of an example illustration of client empowering tools and functions provided by the system 100 of FIG. 1A, according to one exemplary embodiment.

Figure 13:
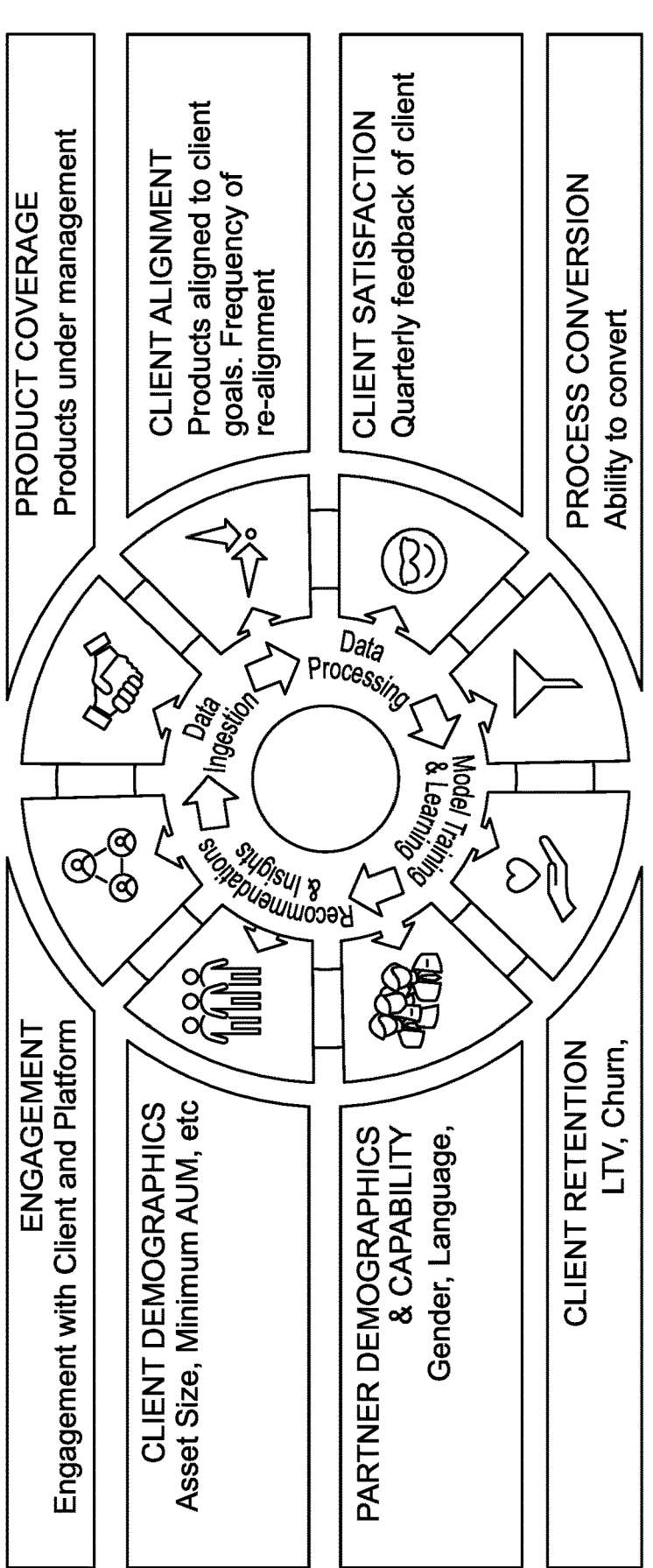
FIG. 13 is graphical representations of an example illustration of functionalities and factors for a partner scoring module of an example system according to one exemplary embodiment.

FIG. 13 is graphical representations of an example illustration of functionalities and factors for a partner scoring module of the FAR 140 of the system 100 of FIG. 1A, according to one exemplary embodiment. The factors to generate a partner score may comprise engagement, client demographics, partner demographics and capability, client retention, product coverage, client alignment, client satisfaction, sales conversion, etc. In some embodiments, this partner score may be used to match customers with financial advisors.

Figure 14:
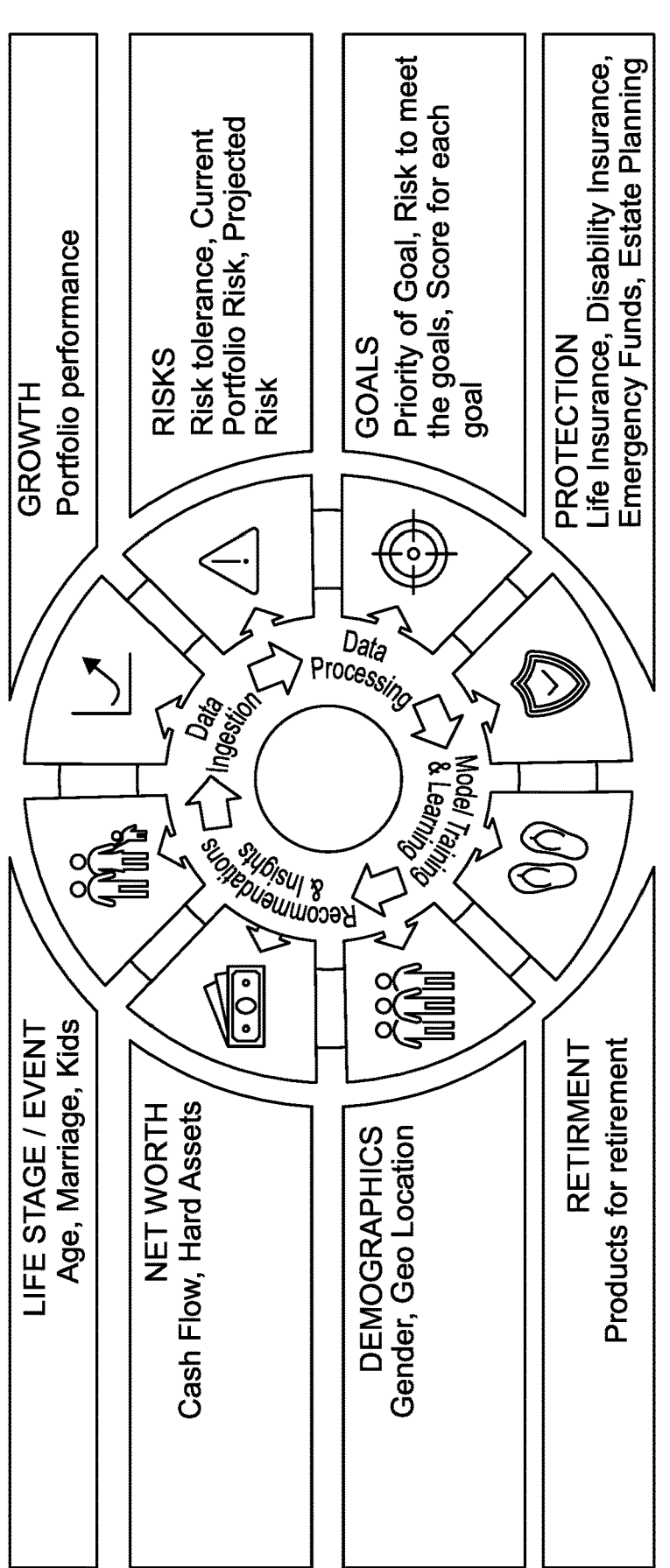
FIG. 14 is graphical representations of an example illustration of factors for a wellness scoring module of an example system according to one exemplary embodiment.

FIG. 14 is graphical representations of an example illustration of factors for a wellness scoring module of the FAR 140 of the system 100 of FIG. 1A, according to one exemplary embodiment. The factors to generate a wellness score may comprise life stage/event, net worth, demographics, retirement, growth, risks, goals, protection, etc. In some embodiments, the wellness score may comprise a risk tolerance score. In some embodiments, this wellness score may be recalculated when there is a life change event.

FIG. 15 is graphical representations of an example illustration of the functionalities provided by the server platform 120 of FIG. 1A, according to one exemplary embodiment. According to FIG. 15, the platform 120 may provide financial assurance, fiduciary alignment, consultant matching, recommended manner of engagement, product matching, sentiment discovery, product discovery, and consultant insights.

FIG. 16 is graphical representations of an example illustration of the underlying analysis for different audiences provided by the server platform 120 of FIG. 1A, according to one exemplary embodiment.

FIG. 17 is graphical representations of an example illustration of the recommendation functionalities and entities provided by the server platform 120 of FIG. 1A, according to one exemplary embodiment. According to FIG. 17, the factors considered for recommendations may comprise, without limitation, client goal, client demographic, product features, partner profile, and the like. The recommendations may include, without limitation, product matching, consultant matching, financial alignment, and fiduciary alignment, etc.

Figure 18:
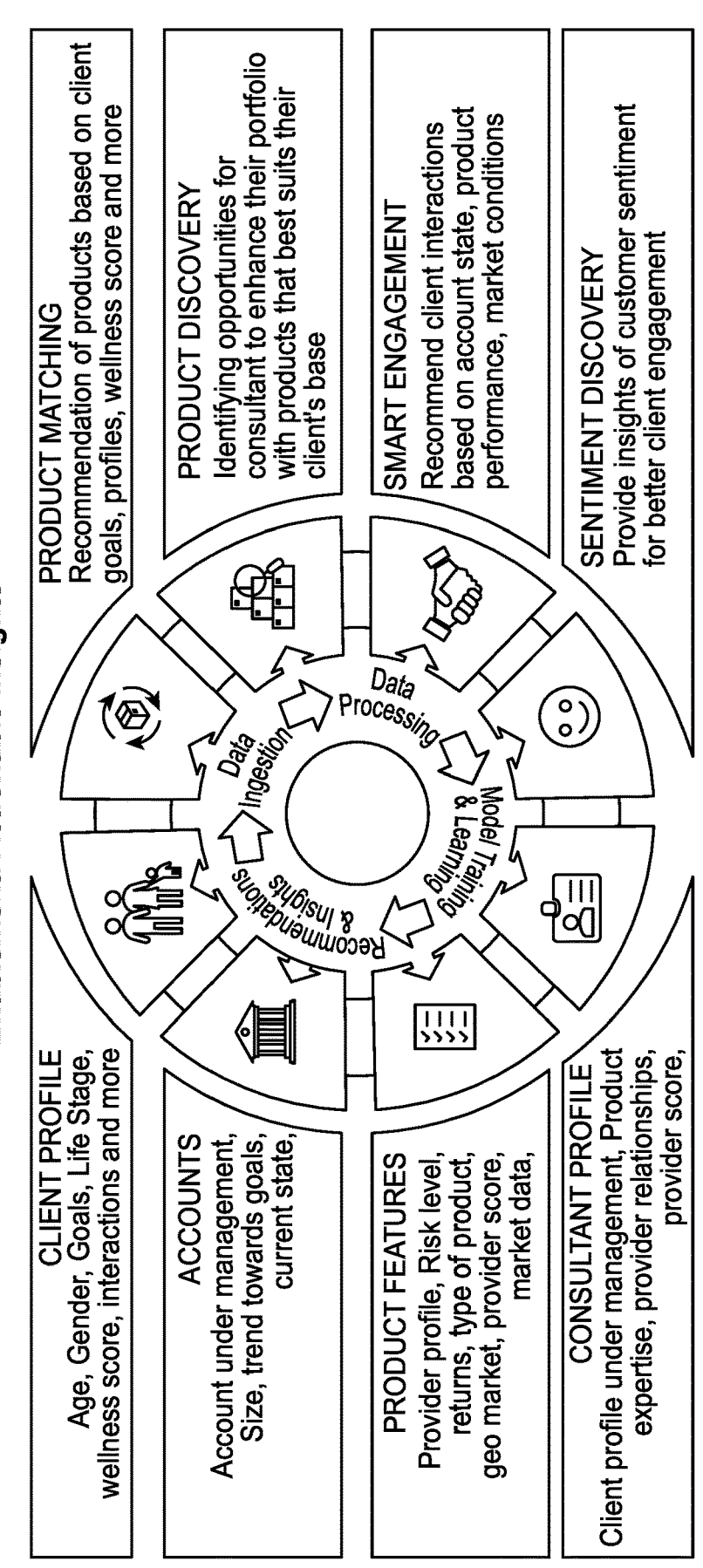
FIG. 18 is graphical representations of an example illustration of the actionable insights provided by various modules and platforms according to one exemplary embodiment.

FIG. 18 is graphical representations of an example illustration of the actionable insights provided by the server platform 120 of FIG. 1A, according to one exemplary embodiment. The actionable insights may be generated by the system based on a variety of factors including, without limitation, client profile, accounts, product features, consultant profile, product matching, product discovery, smart engagement, sentiment discovery, and the like.

Computer Systems

Figure 19:
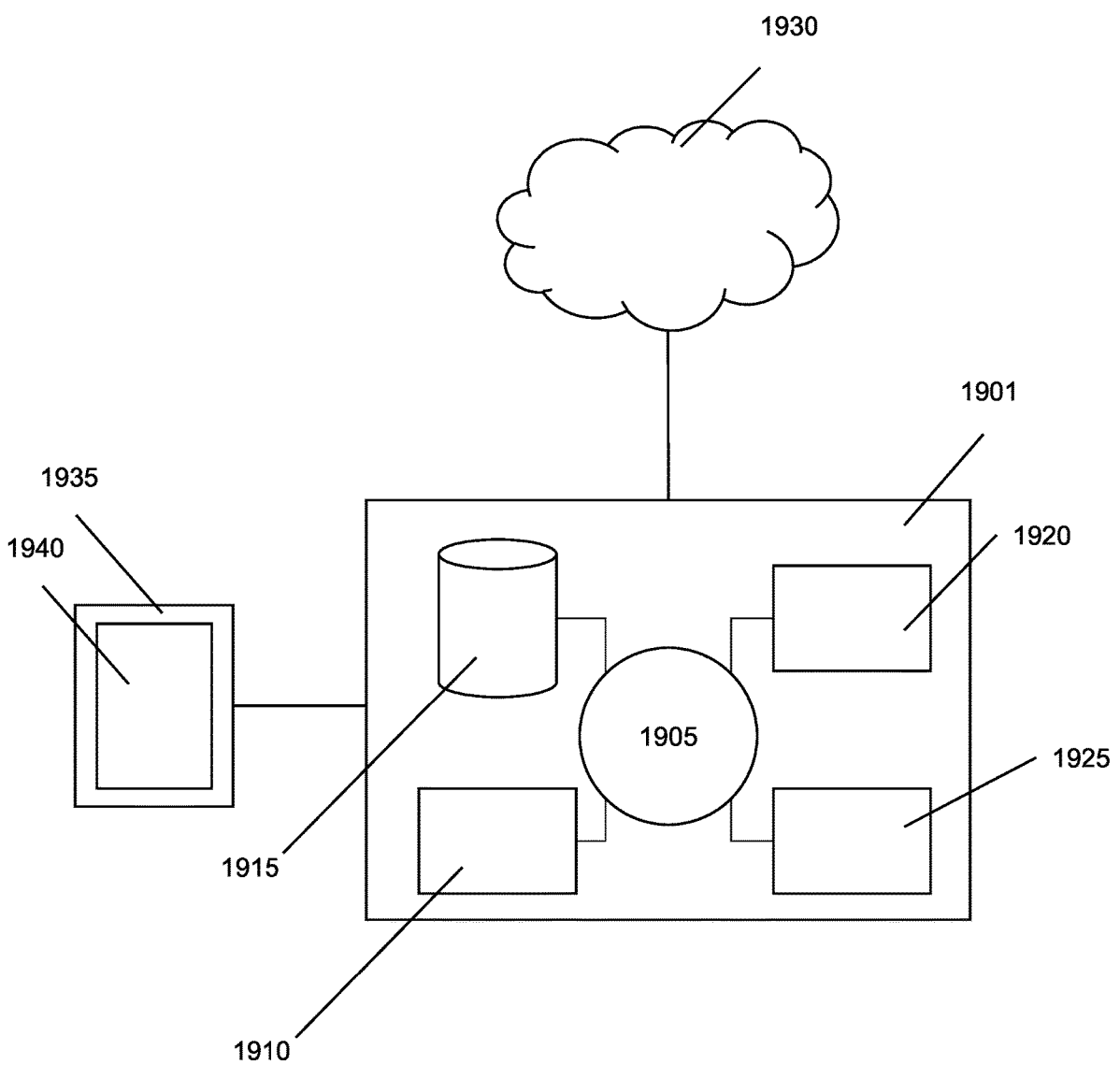
FIG. 19 shows a computer system that is programmed or otherwise configured to implement methods provided herein.

The present disclosure provides computer systems that are programmed to implement methods of the disclosure. FIG. 19 shows a computer system 1901 that is programmed or otherwise configured to provide the functionalities of the instant system. The computer system 1901 can regulate various aspects of optimizing workflow of the present disclosure. The computer system 1901 can be an electronic device of a user or a computer system that is remotely located with respect to the electronic device. The electronic device can be a mobile electronic device.

The computer system 1901 includes a central processing unit (CPU, also "processor" and "computer processor" herein) 1905, which can be a single core or multi core processor, or a plurality of processors for parallel processing. The computer system 1901 also includes memory or memory location 1910 (e.g., random-access memory, read-only memory, flash memory), electronic storage unit 1915 (e.g., hard disk), communication interface 1920 (e.g., network adapter) for communicating with one or more other systems, and peripheral devices 1925, such as cache, other memory, data storage and/or electronic display adapters. The memory 1910, storage unit 1915, interface 1920 and peripheral devices 1925 are in communication with the CPU 1905 through a communication bus (solid lines), such as a motherboard. The storage unit 1915 can be a data storage unit (or data repository) for storing data. The computer system 1901 can be operatively coupled to a computer network ("network") 1930 with the aid of the communication interface 1920. The network 1930 can be the Internet, an internet and/or extranet, or an intranet and/or extranet that is in communication with the Internet. The network 1930 in some cases is a telecommunication and/or data network. The network 1930 can include one or more computer servers, which can enable distributed computing, such as cloud computing. The network 1930, in some cases with the aid of the computer system 1901, can implement a peer-to-peer network, which may enable devices coupled to the computer system 1901 to behave as a client or a server.

The CPU 1905 can execute a sequence of machine-readable instructions, which can be embodied in a program or software. The instructions may be stored in a memory location, such as the memory 1910. The instructions can be directed to the CPU 1905, which can subsequently program or otherwise configure the CPU 1905 to implement methods of the present disclosure. Examples of operations performed by the CPU 1905 can include fetch, decode, execute, and writeback.

The CPU 1905 can be part of a circuit, such as an integrated circuit. One or more other components of the system 1901 can be included in the circuit. In some cases, the circuit is an application specific integrated circuit (ASIC).

The storage unit 1915 can store files, such as drivers, libraries and saved programs. The storage unit 1915 can store user data, e.g., user preferences and user programs. The computer system 1901 in some cases can include one or more additional data storage units that are external to the computer system 1901, such as located on a remote server that is in communication with the computer system 1901 through an intranet or the Internet.

The computer system 1901 can communicate with one or more remote computer systems through the network 1930. For instance, the computer system 1901 can communicate with a remote computer system of a user (e.g., desktop). Examples of remote computer systems include personal computers (e.g., portable PC), slate or tablet PC's (e.g., Apple® iPad, Samsung® Galaxy Tab), telephones, smart phones (e.g., Apple® iphone, Android-enabled device, Blackberry®), or personal digital assistants. The user can access the computer system 1901 via the network 1930.

Methods as described herein can be implemented by way of machine (e.g., computer processor) executable code stored on an electronic storage location of the computer system 1901, such as, for example, on the memory 1910 or electronic storage unit 1915. The machine executable or machine readable code can be provided in the form of software. During use, the code can be executed by the processor 1905. In some cases, the code can be retrieved from the storage unit 1915 and stored on the memory 1910 for ready access by the processor 1905. In some situations, the electronic storage unit 1915 can be precluded, and machine-executable instructions are stored on memory 1910.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1901, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1901 can include or be in communication with an electronic display 1935 that comprises a user interface (UI) 1940 for providing, for example, communications between client nodes and the platform. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1905.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for dynamically generating a recommendation, the method comprising:
   (a) maintaining one or more timeseries databases configured to store:
   i) customer profiles associated with a plurality of customers, wherein the customer profiles comprise customer portfolios each comprising timeseries data stored in the one or more timeseries databases;
   ii) product traits associated with a plurality of products, wherein the product traits comprise product interest data stored in the one or more timeseries databases associated with timestamps, and wherein the product interest data is dynamically modifiable by a decay function based at least in part on the timestamps; and
   iii) advisor profiles associated with a plurality of advisors, wherein an advisor profile comprises an advisor score generated by a first model based on an engagement data of the associated advisor, and wherein the engagement data of the associated advisor is stored in the one or more timeseries databases associated with timestamps, and wherein the advisor score is weighted based at least in part on the timestamps;
   (b) training a model on a training data set by:
   i) constructing a graph data structure comprising nodes each representing one of a plurality of customers, advisors, or products from historical data, and edges connecting pairs of nodes, wherein an edge connecting an advisor node to a customer node is weighted by a value derived from the product traits associated with the product involved in the advisor-customer relationship represented by that edge,
   ii) identifying, within the graph data structure, closed-loop triangular subgraphs each comprising one customer node, one advisor node, and one product node, wherein each identified closed-loop triangular subgraph indicates a historical three-way match among the represented customer, advisor, and product, and associating a matched label with the customer-advisor-product combination represented by each identified closed-loop triangular subgraph,
   iii) adjusting parameters of the model by comparing predicted match outputs of the model for candidate customer-advisor-product combinations against the matched and not-matched labels, and updating the parameters based on the comparison, including based on whether a customer accepted, rejected, or selected a different product than a previously recommended product;
   (c) receiving an event, wherein the event is indicative of one of a plurality of triggers to adjust a customer portfolio associated with a customer, wherein the event is stored in the one or more timeseries databases with a timestamp and wherein the customer portfolio comprises at least a risk tolerance score and a financial goal associated with the customer;
   (d) upon adjusting the customer portfolio, modifying at least the product interest data of the product traits by applying the decay function and taking as input the product traits comprising the modified product interest data, the adjusted customer profile, and the advisor profiles, by the model trained in (b), to generate an output indicative of a match among i) the customer, ii)

an advisor from the plurality of the advisors and iii) a product from the plurality of products; and (e) transmitting the output in (d) to a user device associated with the customer or a user device associated with the advisor.

2. The method of claim 1, wherein the model generates an alignment score between a customer and an advisor for the product, and if the alignment score exceeds a pre-defined threshold, the model generates the output indicative of a match between the customer and the advisor for the product.

3. The method of claim 1, wherein the event comprises receiving a new product and product traits associated with the new product, and wherein the selected product is the new product.

4. The method of claim 1, wherein the event comprises a market change.

5. The method of claim 1, wherein the advisor profiles comprise advisor bandwidths and advisor expertise areas.

6. The method of claim 1, further comprising:

transmitting an advisor notification to the user device associated with the advisor, wherein the advisor notification comprises a customer profile associated with the customer, and product traits associated with the product.

7. The method of claim 6, wherein the advisor notification further comprises a set of suggestions indicative of communication channel, communication frequency, and communication time frame with the customer.

8. The method of claim 1, further comprising:

transmitting a customer notification to the user device associated with the customer, wherein the customer notification comprises the advisor profile associated with the advisor.

9. A computer-implemented method for dynamically generating a recommendation, the method comprising:

(a) maintaining one or more timeseries databases configured to store:

i) customer profiles associated with a plurality of customers, wherein the customer profiles comprise customer financial goals and customer portfolio and wherein a customer portfolio comprises timeseries data stored in the one or more timeseries databases and a risk tolerance score associated with a respective customer;

ii) product traits associated with a plurality of products, wherein the product traits comprise product interest data stored in the one or more timeseries databases associated with timestamps, and wherein the product interest data is dynamically modifiable by a decay function based at least in part on the timestamps; and iii) advisor profiles associated with a plurality of advisors, wherein an advisor profile comprises an advisor score generated by a first model based on an engagement data of the associated advisor, and wherein the first model is trained by a machine learning algorithm using training data comprising a set of similar advisors' engagement data and associated advisor scores and wherein a feedback from a customer is fed back to the machine learning algorithm to update the first model;

(b) training a model on a training data set by:

i) constructing a graph data structure comprising nodes each representing one of a plurality of customers, advisors, or products from historical data, and edges connecting pairs of nodes, wherein an edge connecting an advisor node to a customer node is weighted by a value derived from the product traits associated with the product involved in the advisor-customer relationship represented by that edge, ii) identifying, within the graph data structure, closed-loop triangular subgraphs each comprising one customer node, one advisor node, and one product node, wherein each identified closed-loop triangular subgraph indicates a historical three-way match among the represented customer, advisor, and product, and associating a matched label with the customer-advisor-product combination represented by each identified closed-loop triangular subgraph, iii) adjusting parameters of the model by comparing predicted match outputs of the model for candidate customer-advisor-product combinations against the matched label and not-matched labels, and updating the parameters based on the comparison, including based on whether a customer accepted, rejected, or selected a different product than a previously recommended product;

(c) receiving an event indicative of a market change and detecting a change in the product traits associated with one or more of the products based at least in part on the market change;

(d) upon detecting the change in the product traits of the one or more products, performing a balancing action to re-align with the customer financial goals of the associated customers using a forecast model while the change is determined to be within the risk tolerance score of the associated customers;

(e) taking as input the adjusted product traits, the customer profiles associated with the plurality of customers, and the advisor profiles, by the model trained in (b), to generate an output indicative of a match among i) one of the plurality of customers, ii) an advisor from the plurality of advisors and iii) a product from the plurality of products; and (f) transmitting the output of the model to a user device associated with the customer or a user device associated with the advisor.

10. The method of claim 9, wherein the advisor profiles comprise advisor bandwidths and advisor expertise areas.

11. The method of claim 9, further comprising:

transmitting an advisor notification to the user device associated with the advisor, wherein the advisor notification comprises a customer profile associated with the customer, and product traits associated with the product.

12. The method of claim 11, wherein the advisor notification further comprises a set of suggestions indicative of communication channel, communication frequency, and communication time frame with the customer.

13. The method of claim 9, further comprising:

transmitting a customer notification to the user device associated with the customer, wherein the customer notification comprises the advisor profile associated with the advisor.

* * * * *